US012313784B2

(12) United States Patent
Liao et al.

(10) Patent No.: US 12,313,784 B2
(45) Date of Patent: *May 27, 2025

(54) HALF AND QUARTER LISSAJOUS SCAN PATTERNS FOR LIDAR

(71) Applicant: Cepton Technologies, Inc., San Jose, CA (US)

(72) Inventors: Dongyi Liao, Mountain View, CA (US); Jun Pei, Saratoga, CA (US); Mark A. McCord, Los Gatos, CA (US)

(73) Assignee: Cepton Technologies, Inc., San Jose, CA (US)

( * ) Notice: Subject to any disclaimer, the term of this patent is extended or adjusted under 35 U.S.C. 154(b) by 1190 days.

This patent is subject to a terminal disclaimer.

(21) Appl. No.: 17/133,355

(22) Filed: Dec. 23, 2020

(65) Prior Publication Data

US 2021/0199778 A1  Jul. 1, 2021

Related U.S. Application Data

(60) Provisional application No. 62/955,359, filed on Dec. 30, 2019.

(51) Int. Cl.
*G01S 7/481* (2006.01)
*G01S 17/894* (2020.01)

(52) U.S. Cl.
CPC .......... *G01S 7/4817* (2013.01); *G01S 17/894* (2020.01)

(58) Field of Classification Search
None
See application file for complete search history.

(56) References Cited

U.S. PATENT DOCUMENTS 4,302,709 A   11/1981   Tichtinsky
5,254,844 A   10/1993   Krichever et al.
(Continued)

FOREIGN PATENT DOCUMENTS

CN   101408672 A   4/2009
CN   102027404 A   4/2011
(Continued)

OTHER PUBLICATIONS

Scanning probe microscopy, scanning methods (Year: 2017).*
(Continued)

*Primary Examiner* — Hovhannes Baghdasaryan
*Assistant Examiner* — Jempson Noel
(74) *Attorney, Agent, or Firm* — Kilpatrick Townsend & Stockton LLP

(57) ABSTRACT

A LiDAR system includes a fixed frame, a first platform, an electro-optic assembly including one or more laser sources and one or more detectors mounted on the first platform; a flexure assembly flexibly coupling the first platform to the fixed frame; a drive mechanism configured to translate the first platform with respect to the fixed frame in two dimensions in a plane substantially perpendicular to an optical axis of the LiDAR system; and a controller configured to cause the drive mechanism to translate the first platform in a first direction with a first frequency and in a second direction orthogonal to the first direction with a second frequency that is different from the first frequency, acquire a point cloud, and output the point cloud at a frame rate that is an integer times a difference between the second frequency and the first frequency, the integer being greater than one.

20 Claims, 18 Drawing Sheets

(56) References Cited

U.S. PATENT DOCUMENTS

| | | | |
|---|---|---|---|
| 5,529,277 | A | 6/1996 | Ostaszewski |
| 5,827,266 | A | 10/1998 | Harel et al. |
| 6,424,735 | B1* | 7/2002 | Freifeld ............. G01B 11/2518 356/3 |
| 10,921,431 | B2 | 2/2021 | Pei et al. |
| 2006/0192858 | A1 | 8/2006 | Calvet |
| 2007/0103699 | A1 | 5/2007 | Kohnen et al. |
| 2007/0181810 | A1 | 8/2007 | Tan et al. |
| 2010/0053330 | A1* | 3/2010 | Hellickson ............. G01S 19/13 382/103 |
| 2011/0205523 | A1 | 8/2011 | Rezk et al. |
| 2013/0300999 | A1* | 11/2013 | DeJong ................ H04N 9/3129 351/158 |
| 2014/0153001 | A1 | 6/2014 | Chayat et al. |
| 2017/0047199 | A1* | 2/2017 | Yao ..................... H01J 37/3174 |
| 2017/0307758 | A1 | 10/2017 | Pei et al. |
| 2017/0307759 | A1 | 10/2017 | Pei et al. |
| 2018/0180722 | A1* | 6/2018 | Pei ........................ G01S 7/4863 |
| 2019/0120940 | A1 | 4/2019 | Pei et al. |
| 2019/0121123 | A1 | 4/2019 | Kaupmann |
| 2019/0257922 | A1 | 8/2019 | McCord et al. |

FOREIGN PATENT DOCUMENTS

| | | | |
|---|---|---|---|
| CN | 102393516 | A | 3/2012 |
| CN | 106226899 | A | 12/2016 |
| EP | 0 425 844 | A2 | 5/1991 |
| JP | H11-168064 | A | 6/1999 |
| JP | 2000-338430 | A | 12/2000 |
| JP | 2007-155541 | A | 6/2007 |
| JP | 4807695 | B2 | 11/2011 |
| KR | 10-1996-0015058 | A | 5/1996 |
| KR | 10-2007-0012651 | A | 1/2007 |
| KR | 10-2007-0086874 | A | 8/2007 |
| KR | 10-2008-0088501 | A | 10/2008 |
| KR | 10-2010-0053465 | A | 5/2010 |
| KR | 10-2010-0106517 | A | 10/2010 |
| KR | 10-2016-0070128 | A | 6/2016 |
| WO | WO-2017189185 | A1* | 11/2017 ............... B60R 1/00 |

OTHER PUBLICATIONS

Invitation to Pay Additional Fees and, Where Applicable, Protest Fee, mailed Nov. 19, 2018 in related PCT/US18/55363 (two pages).
International Search Report and Written Opinion mailed Jan. 29, 2019 in related PCT/US18/55363 (eleven pages).
Bazaei, et al., "High-speed Lissajous-scan atomic force microscopy: Scan pattern planning and control design issues", Review of Scientific Instruments, School of Electrical Engineering and Computer Science, vol. 83, The University of Newcastle, Callaghan, NSW 2308, Australia, 83, 063701, American Institute of Physics (Jun. 4, 2012) (ten pages).
International Preliminary Report on Patentability mailed Apr. 30, 2020 in related PCT/US2018/055363 (eight pages).
Non-Final Office Action dated Jun. 30, 2020 in related U.S. Appl. No. 15/971,548 (ten pages).
Korean Office Action dated Jul. 16, 2020 in related Korean Application No. 10-2020-7014225 (five pages).
Japanese Office Action dated Sep. 4, 2020 in related Japanese Application No. 2020-522035 (seven pages).
Notice of Allowance dated Oct. 15, 2020 in related U.S. Appl. No. 15/971,548 (eight pages).
Notice of Decision to Grant dated Oct. 15, 2020 in related Korean Application No. 10-2020-7014225 (five pages).
Extended European Search Report dated Oct. 23, 2020 in related European Application No. 18868039.1 (seven pages).
Chinese Office Action dated Nov. 3, 2020 in related Chinese Application No. 201880078289.5 (twelve pages).
Corrected Notice of Allowability dated Nov. 13, 2020 in related U.S. Appl. No. 15/971,548.
Corrected Notice of Allowability dated Nov. 17, 2020 in related U.S. Appl. No. 15/971,548.
International Preliminary Report on Patentability in related International Application PCT/US2020/067178 issued Jul. 14, 2022 (nine pages).
International Search Report and Written Opinion of the International Searching Authority mailed Mar. 17, 2021 in related corresponding International Application No. PCT/US20/67178, filed Dec. 28, 2020 (ten pages).
Yong et al., "Design and Control of a Novel Non-Raster Scan Pattern for Fast Scanning Probe Microscopy," The 2012 IEEE/ASME International Conference on Advanced Intelligent Mechatronics, pp. 456-461, Jul. 11-14, 2012 (Year: 2012).

* cited by examiner

HALF AND QUARTER LISSAJOUS SCAN PATTERNS FOR LIDAR

CROSS-REFERENCES TO RELATED APPLICATIONS

This application claims the benefit of U.S. Provisional Patent Application No. 62/955,359, filed on Dec. 30, 2019, entitled "HALF AND QUARTER LISSAJOUS SCAN PATTERNS FOR LIDAR," the contents of which is incorporated by reference in its entirety.

BACKGROUND OF THE INVENTION

Three-dimensional sensors can be applied in autonomous vehicles, drones, robotics, security applications, and the like. Scanning LIDAR sensors may achieve high angular resolutions appropriate for such applications at an affordable cost. However, improved scanning apparatuses and methods are needed.

SUMMARY OF THE INVENTION

According to some embodiments, a scanning LiDAR system includes a fixed frame, a first platform, and an electro-optic assembly mounted on the first platform. The electro-optic assembly includes one or more laser sources and one or more detectors, each respective detector corresponding a respective laser source. The scanning LiDAR system further includes a flexure assembly flexibly coupling the first platform to the fixed frame; a drive mechanism configured to, via the flexure assembly, translate the first platform with respect to the fixed frame in two dimensions in a plane substantially perpendicular to an optical axis of the scanning LiDAR system; and a controller coupled to the drive mechanism. The controller is configured to cause the drive mechanism to translate the first platform in a first direction with a first frequency and in a second direction orthogonal to the first direction with a second frequency that is different from the first frequency, acquire a point cloud using the one or more laser sources and the one or more detectors while the first platform is being translated, and output the point cloud at a frame rate that is an integer times a difference between the second frequency and the first frequency, the integer being greater than one.

According to some embodiments, a method of three-dimensional imaging using a LiDAR system includes scanning the LiDAR system in a first direction with a first frequency and in a second direction orthogonal to the first direction with a second frequency that is different from the first frequency. The LiDAR system includes an electro-optic assembly that comprises one or more laser sources and one or more detectors, each respective detector corresponding a respective laser source. The scanning of the LiDAR system in the first direction and the second directions scans a laser beam emitted by each respective laser source across a respective sub-field of view. The method further includes emitting, using each of the one or more laser sources, a plurality of laser pulses as the LiDAR system is scanned in the first direction and the second direction; and detecting, using each of the one or more detectors, a portion of each respective laser pulse of the plurality of laser pulses reflected off of one or more objects. The method further includes determining, using a processor, a time of flight for each respective laser pulse from emission to detection; and acquiring a point cloud of the one or more objects based on the times of flight of the plurality of laser pulses from each laser source. The method further includes outputting the point cloud at a frame rate that is an integer times a difference between the second frequency and the first frequency, the integer being greater than one.

DETAILED DESCRIPTION OF THE SPECIFIC EMBODIMENTS

The present invention relates generally to LiDAR systems for three-dimensional imaging. More specifically, the present invention relates to methods and apparatuses for scanning a LiDAR system in two dimensions. Merely by way of example, embodiments of the present invention provide scanning apparatuses and methods where the scanning in both the horizontal and vertical directions are fast, and the scanning frequencies in the two directions are similar but not identical. The resulting trajectory of scan points can be characterized by a Lissajous scan pattern (also known as Lissajous curve or Lissajous figure). According to some embodiments, instead of completing a full Lissajous scan pattern (or multiple full Lissajous scan patterns) per frame, a half or a quarter Lissajous scan pattern may be completed per frame. Half or quarter Lissajous scan patterns may provide some advantages, such as more uniformly distributed scan points across a field of view.

Figure 1:
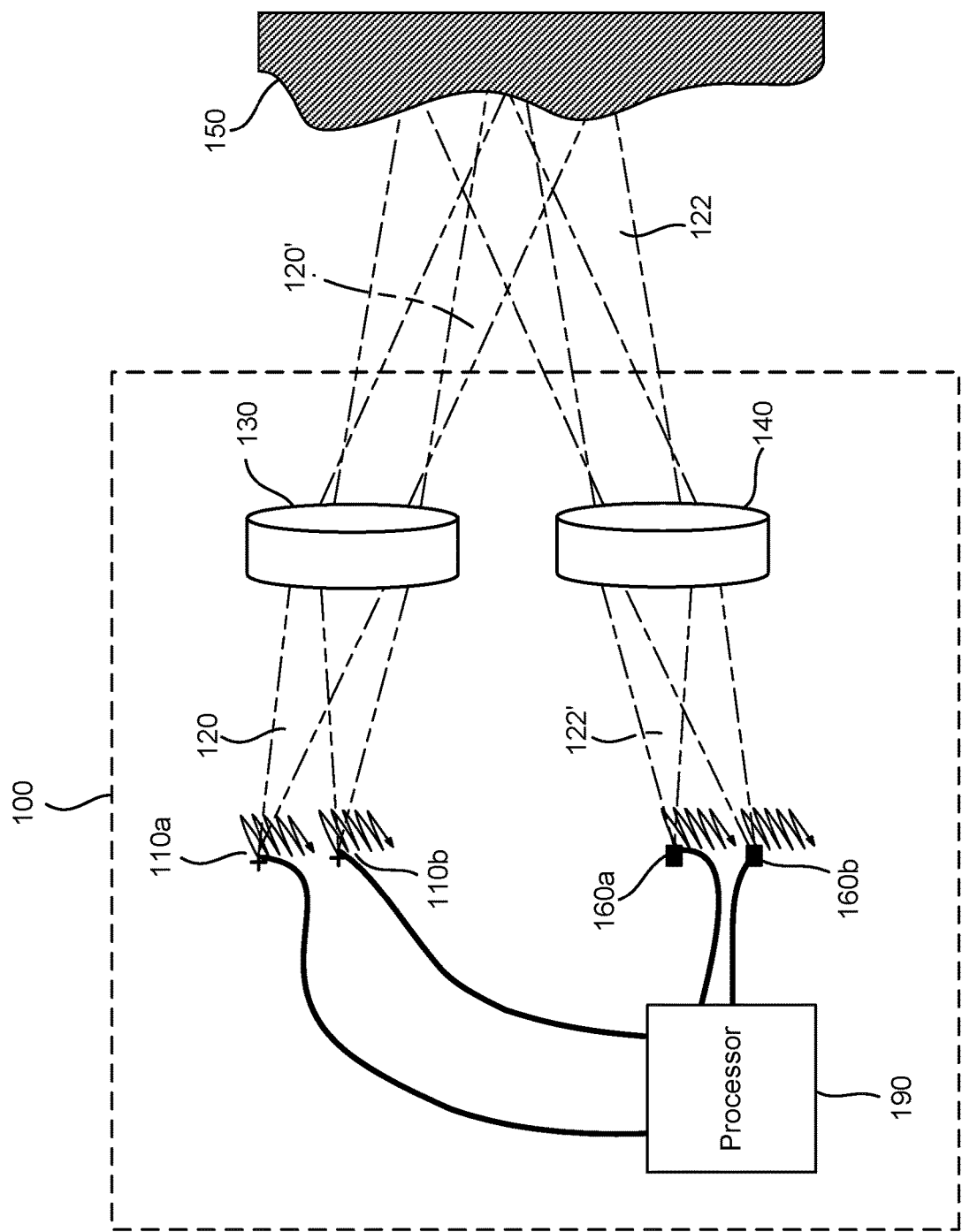
FIG. 1 illustrates schematically a LiDAR sensor for three-dimensional imaging according to some embodiments.

FIG. 1 illustrates schematically a LiDAR sensor 100 for three-dimensional imaging according to some embodiments of the present invention. The LiDAR sensor 100 includes an emitting lens 130 and a receiving lens 140, both being fixed. The LiDAR sensor 100 includes a laser source 110a disposed substantially in a back focal plane of the emitting lens 130. The laser source 110a is operative to emit a laser pulse 120 from a respective emission location in the back focal plane of the emitting lens 130. The emitting lens 130 is configured to collimate and direct the laser pulse 120 toward an object 150 located in front of the LiDAR sensor 100. For a given emission location of the laser source 110a, the collimated laser pulse 120' is directed at a corresponding angle toward the object 150.

A portion 122 of the laser pulse 120 is reflected off of the object 150 toward the receiving lens 140. The receiving lens 140 is configured to focus the portion 122 of the laser pulse 120 reflected off of the object 150 onto a corresponding detection location in the focal plane of the receiving lens 140. The LiDAR sensor 100 further includes a photodetector 160a disposed substantially at the focal plane of the receiving lens 140. The photodetector 160a is configured to receive and detect the portion 122 of the laser pulse 120 reflected off of the object at the corresponding detection location. The corresponding detection location of the photodetector 160a is conjugate with the respective emission location of the laser source 110a.

The laser pulse 120 may be of a short duration, for example, 10 ns pulse width. The LiDAR sensor 100 further includes a processor 190 coupled to the laser source 110a and the photodetector 160a. The processor 190 is configured to determine a time of flight (TOF) of the laser pulse 120 from emission to detection. Since the laser pulse 120 travels at the speed of light, a distance between the LiDAR sensor 100 and the object 150 may be determined based on the determined time of flight.

According to some embodiments, the laser source 110a may be raster scanned to a plurality of emission locations in the back focal plane of the emitting lens 130, and is configured to emit a plurality of laser pulses at the plurality of emission locations. Each laser pulse emitted at a respective emission location is collimated by the emitting lens 130 and directed at a respective angle toward the object 150, and incidents at a corresponding point on the surface of the object 150. Thus, as the laser source 110a is raster scanned within a certain area in the back focal plane of the emitting lens 130, a corresponding object area on the object 150 is scanned. The photodetector 160a is raster scanned to a plurality of corresponding detection locations in the focal plane of the receiving lens 140. The scanning of the photodetector 160a is performed synchronously with the scanning of the laser source 110a, so that the photodetector 160a and the laser source 110a are always conjugate with each other at any given time.

By determining the time of flight for each laser pulse emitted at a respective emission location, the distance from the LiDAR sensor 100 to each corresponding point on the surface of the object 150 may be determined. In some embodiments, the processor 190 is coupled with a position encoder that detects the position of the laser source 110a at each emission location. Based on the emission location, the angle of the collimated laser pulse 120' may be determined. The X-Y coordinate of the corresponding point on the surface of the object 150 may be determined based on the angle and the distance to the LiDAR sensor 100. Thus, a three-dimensional image of the object 150 may be constructed based on the measured distances from the LiDAR sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return laser pulse is measured and used to adjust the power of subsequent laser pulses from the same emission point, in order to prevent saturation of the detector, improve eye-safety, or reduce overall power consumption. The power of the laser pulse may be varied by varying the duration of the laser pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the intensity may also be used to add another dimension to the image. For example, the image may contain X, Y, and Z coordinates, as well as reflectivity (or brightness).

The angular field of view (AFOV) of the LiDAR sensor 100 may be estimated based on the scanning range of the laser source 110a and the focal length of the emitting lens 130 as, $$AFOV = 2\tan^{-1}\left(\frac{h}{2f}\right), \quad (1)$$

where h is scan range of the laser source 110a along certain direction, and f is the focal length of the emitting lens 130. For a given scan range h, shorter focal lengths would produce wider AFOVs. For a given focal length f, larger scan ranges would produce wider AFOVs. In some embodiments, the LiDAR sensor 100 may include multiple laser sources disposed as an array at the back focal plane of the emitting lens 130, so that a larger total AFOV may be achieved while keeping the scan range of each individual laser source relatively small. Accordingly, the LiDAR sensor 100 may include multiple photodetectors disposed as an array at the focal plane of the receiving lens 140, each photodetector being conjugate with a respective laser source. For example, the LiDAR sensor 100 may include a second laser source 110b and a second photodetector 160b, as illustrated in FIG. 1. In other embodiments, the LiDAR sensor 100 may include four laser sources and four photodetectors, or eight laser sources and eight photodetectors. In one embodiment, the LiDAR sensor 100 may include 8 laser sources arranged as a 4×2 array and 8 photodetectors arranged as a 4×2 array, so that the LiDAR sensor 100 may have a wider AFOV in the horizontal direction than its AFOV in the vertical direction. According to various embodiments, the total AFOV of the LiDAR sensor 100 may range from about 5 degrees to about 15 degrees, or from about 15 degrees to about 45 degrees, or from about 45 degrees to about 90 degrees, depending on the focal length of the emitting lens, the scan range of each laser source, and the number of laser sources.

The laser source 110a may be configured to emit laser pulses in the ultraviolet, visible, or near infrared wavelength ranges. The energy of each laser pulse may be in the order of microjoules, which is normally considered to be eye-safe for repetition rates in the KHz range. For laser sources operating in wavelengths greater than about 1500 nm, the energy levels could be higher as the eye does not focus at those wavelengths. The photodetector 160*a* may comprise a silicon avalanche photodiode, a photomultiplier, a PIN diode, or other semiconductor sensors.

The angular resolution of the LiDAR sensor 100 can be effectively diffraction limited, which may be estimated as, $$\theta = 1.22 \lambda / D, \tag{2}$$

where $\lambda$ is the wavelength of the laser pulse, and D is the diameter of the lens aperture. The angular resolution may also depend on the size of the emission area of the laser source 110*a* and aberrations of the lenses 130 and 140. According to various embodiments, the angular resolution of the LiDAR sensor 100 may range from about 1 mrad to about 20 mrad (about 0.05-1.0 degrees), depending on the type of lenses.

As described above, a laser source and a photodetector in a LiDAR system may be raster scanned in two dimensions in a plane substantially perpendicular to an optical axis of the LiDAR system, in order to form three-dimensional images of objects within a certain field of view. Traditionally, two-dimensional scanning may be achieved by using a combination of a relatively fast scan in one direction (e.g., a line scan) and a much slower scan in the orthogonal direction (e.g., a sweep or frame scan). For the convenience of description, the fast scan may be referred herein as a horizontal scan, and the slow scan may be referred herein as a vertical scan. Such scanning methods may have certain disadvantages when applied in autonomous vehicles. For example, the scanning frequency in the slow direction may correspond to the frequency of encountering road bumps, which may affect the positional accuracy of the three-dimensional imaging by the LiDAR system.

Embodiments of the present invention provide scanning apparatuses and methods where the scanning in both the horizontal and vertical directions are fast, and the scanning frequencies in the two directions are similar but not identical. The resulting trajectory of the laser source or the photodetector may be characterized by a Lissajous pattern (also known as Lissajous curve or Lissajous figure). Mathematically, a Lissajous curve is a graph of parametric equations:

$$x = A \sin(2\pi \cdot at + \delta), \; y = B \sin(2\pi \cdot bt), \tag{3}$$

where a and b are the frequencies, in the unit of Hz, in the x direction (e.g., the horizontal direction) and y direction (e.g., the vertical direction), respectively; t is time; and $\delta$ is a phase difference.

Figure 2A:
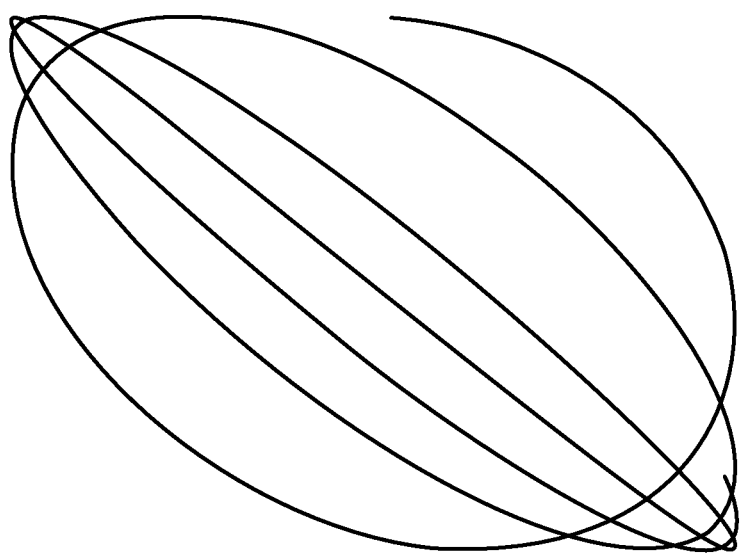
FIGS. 2A and 2B show a partially complete Lissajous pattern and a completed Lissajous pattern, respectively.
Figure 2B:
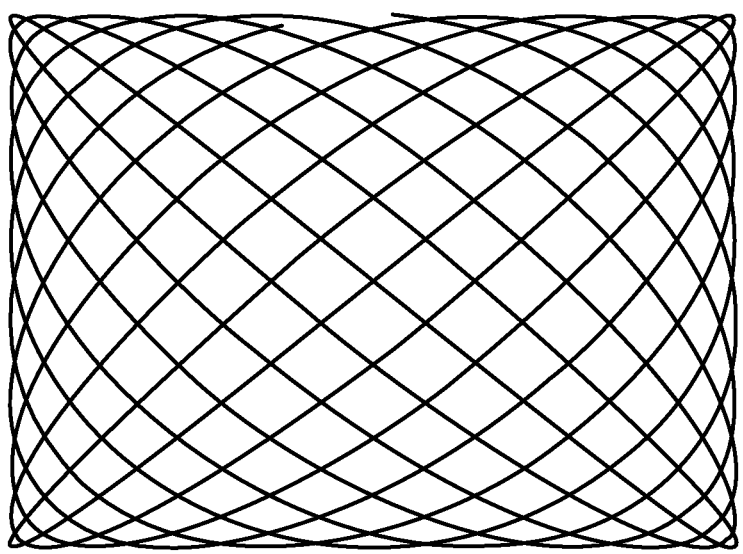

FIG. 2A shows a partially complete Lissajous pattern. FIG. 2B shows a completed Lissajous pattern (e.g., a full Lissajous pattern). The appearance of the pattern may be sensitive to the ratio a/b and the phase difference $\delta$. By choosing the frequencies a and b in the two orthogonal directions to be similar but different from each other, the Lissajous pattern may exhibit many "lobes" in both directions. It may be advantageous to choose both the ratio a/b and the phase difference $\delta$ such that the trajectory of the laser source may cover a field of view relatively uniformly.

The frame rate may be related to the difference between the two frequencies a and b. In some embodiments, the scanning frequencies a and b may be chosen based on a desired frame rate. For instance, if a frame rate of 10 frames per second is desired, a frequency of 200 Hz in the horizontal direction and 210 Hz in the vertical direction may be chosen. In this example, the Lissajous pattern may repeat exactly from frame to frame. By choosing the two frequencies a and b to be significantly greater than the frame rate and properly selecting the phase difference $\delta$, a relatively uniform and dense coverage of the field of view may be achieved.

In some other embodiments, if it is desired for the Lissajous pattern not to repeat, a different frequency ratio may be chosen. For example, the scanning frequencies in the two directions a and b may be chosen to be 200 Hz and 210.1 Hz, respectively. In this example, if the frame rate is 10 frames per second, the Lissajous pattern may not repeat from frame to frame. As another example, the scanning frequencies a and b may be chosen to be 201 Hz and 211 Hz, respectively. In this example, the Lissajous pattern will also shift from frame to frame. In some cases, it may be desirable to have the Lissajous pattern not to repeat from frame to frame, as a trajectory of the laser source from a subsequent frame may fill in gaps of a trajectory from an earlier frame, thereby effectively have a denser coverage of the field of view.

In some embodiments, a frequency separation that is multiples of a desired frame rate may also be used. For example, the scanning frequencies in the two directions a and b may be chosen to be 200 Hz and 220 Hz, respectively. In this case, for example, a frame of either 10 Hz or 20 Hz may be used.

Figure 3A:
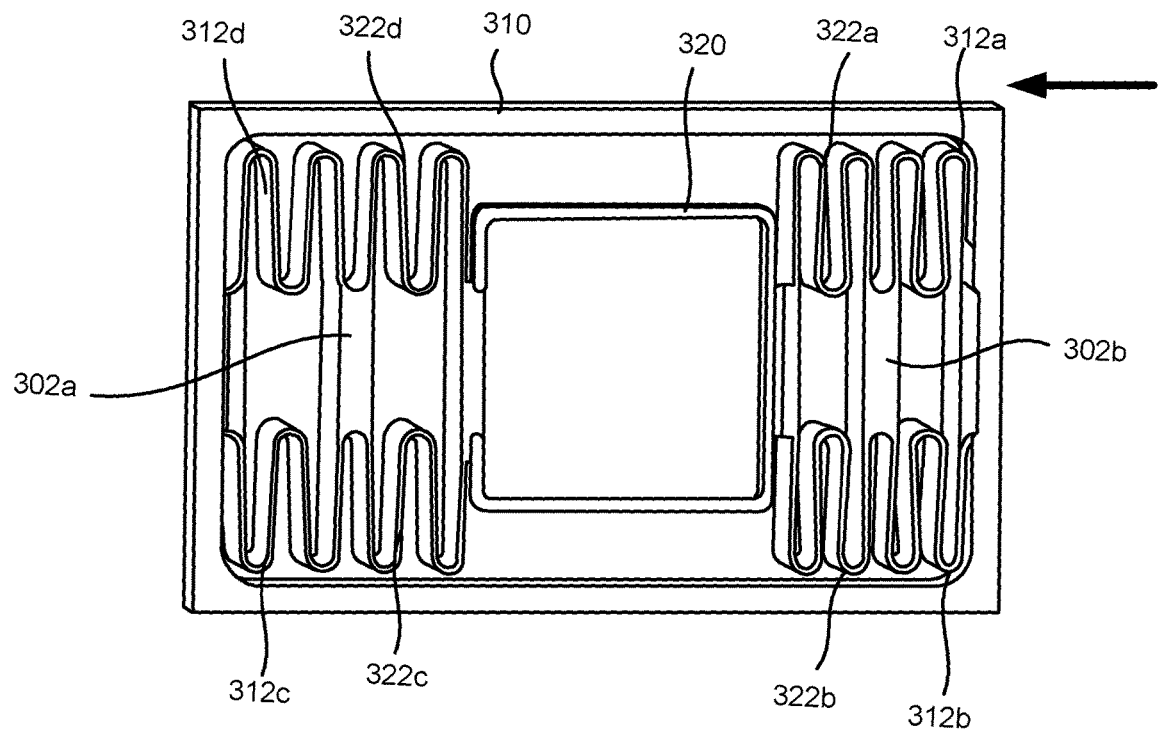
FIGS. 3A and 3B illustrate schematically a flexure mechanism for scanning a LiDAR system according to some embodiments.
Figure 3B:
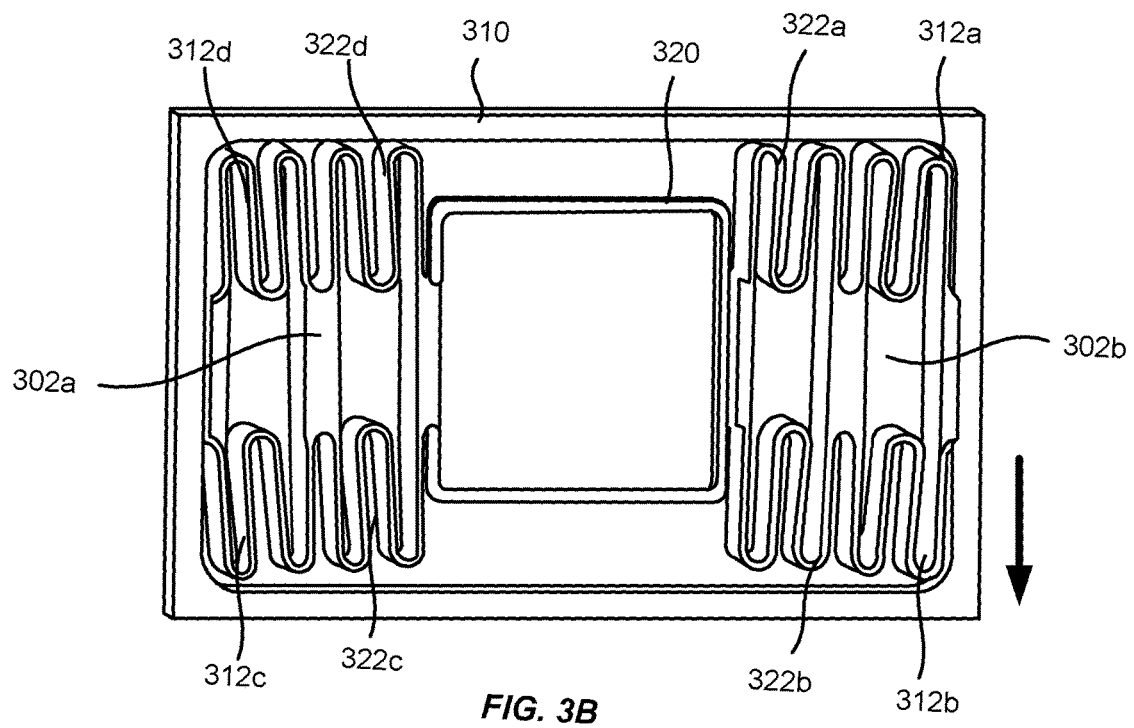

Two-dimensional scanning of a LiDAR system as described above may be implemented using flexures that can be flexed in two orthogonal directions. FIGS. 3A and 3B illustrate schematically a flexure mechanism for scanning a LiDAR system according to some embodiments of the present invention. An outer frame 310 may be attached to two fixed mounting points 302*a* and 302*b* via a first set of four leaf springs 312*a*-312*d*. The mounting points 302*a* and 302*b* may be attached to a fixed frame and are fixed in space. The outer frame 310 may carry an electro-optic assembly of the LiDAR system, which may include one or more laser sources and one or more photodetectors, as described above in relation to FIG. 1.

Each of the first set of leaf springs 312*a*-312*d* may be flexed left or right and up or down, so as to translate the outer frame 310 (and therefore the electro-optic assembly carried by the outer frame 310) horizontally and vertically with respect to the fixed mounting points 302*a* and 302*b*. For example, FIG. 3A shows that the outer frame 310 is translated to the left relative to the fixed mounting points 302*a* and 302*b* (as indicated by the arrow), while FIG. 3B shows that the outer frame 310 is translated downward relative to the fixed mounting points 302*a* and 302*b* (as indicated by the arrow). In some embodiments, each of the first set of four leaf springs 312*a*-312*d* may be convoluted, as illustrated in FIGS. 3A and 3B for a compact configuration.

In some embodiments, an inner frame 320 may be attached to the two fixed mounting points 302*a* and 302*b* via a second set of four leaf springs 322*a*-322*d*, as illustrated in FIGS. 3A and 3B. Similar to the first set of four leaf springs 312*a*-312*d*, each of the second set of leaf springs 322*a*-322*d* may be flexed left or right and up or down, so as to translate the inner frame 320 horizontally and vertically with respect to the fixed mounting points 302*a* and 302*b*.

In practice, to raster scan the electro-optic assembly of the LiDAR system horizontally and vertically, the outer frame 310 and the inner frame 320 may be vibrated at or near their resonance frequencies. By properly selecting the shape of the leaf springs 312*a*-312*d* and 322*a*-322*d*, slightly different resonance frequencies may be achieved in the horizontal and vertical directions. The outer frame 310 and the inner frame 320 may move in opposite directions, i.e., 180 degrees out of phase, similar to what the two prongs of a tuning fork would do. If the weight of the outer frame 310 and the weight of the inner frame 320 are properly balanced, their opposing motions may cancel vibrations that would otherwise be transmitted to the external mounts. In addition to minimizing vibration, this may also increase the resonant quality factor Q of the system, thus reducing power requirements.

In some embodiments, the inner frame 320 may carry a counterweight. Alternatively, the inner frame 320 may carry the electro-optic assembly of the LiDAR system, and the outer frame 310 may carry a counterweight. In some other embodiments, the inner frame 320 may carry a second electro-optic assembly of the LiDAR system that includes one or more laser sources and one or more photodetectors. In some further embodiments, the inner frame 320 may carry magnets or coils of a voice coil motor (VCM) that provides the mechanical drive for flexing the springs 312a-312d and 322a-322d.

Figure 4A:
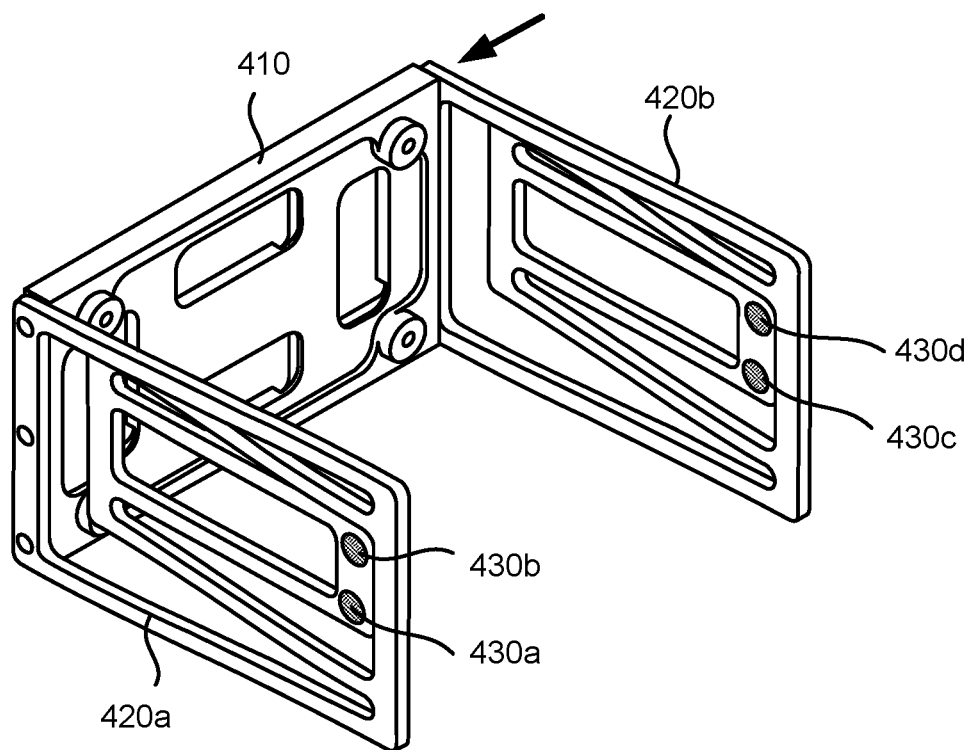
FIGS. 4A and 4B illustrate schematically a flexure mechanism for scanning a LiDAR system according to some other embodiments.
Figure 4B:
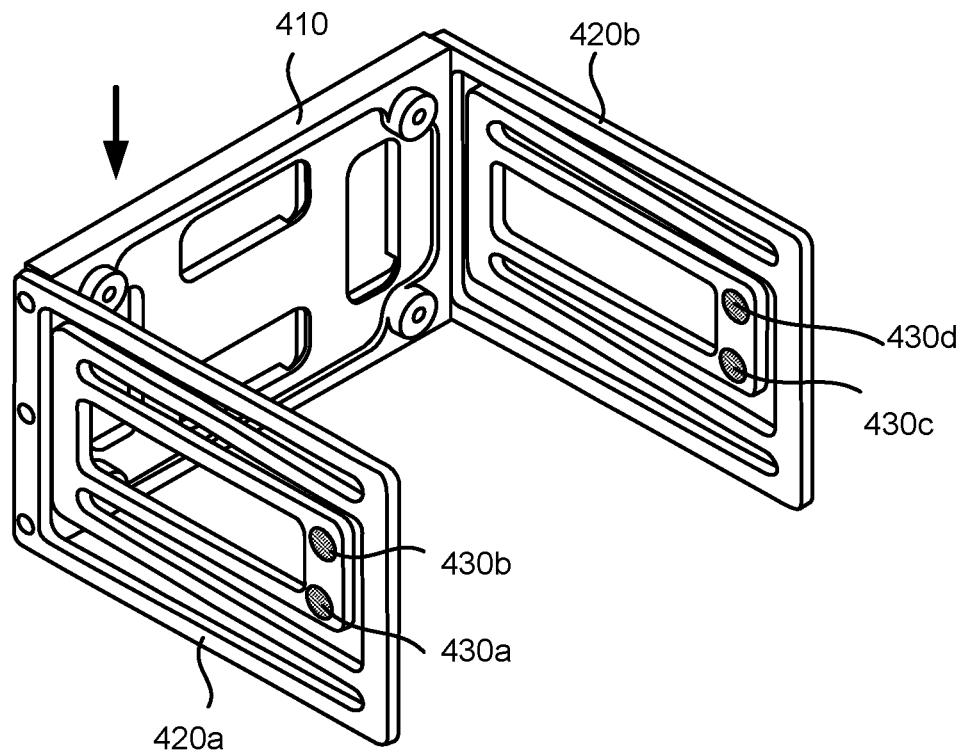

FIGS. 4A and 4B illustrate schematically a resonator structure for scanning a LiDAR system according to some other embodiments of the present invention. A frame 410 may be attached to a pair of flexures 420a and 420b on either side thereof. The frame 410 may carry an electro-optic assembly of the LiDAR system. For clarity, a counterbalance frame and a set of associated flexures are not shown in FIGS. 4A and 4B.

Each of the pair of flexures 420a and 420b may be fabricated by cutting a plate of spring material. A convolution configuration, as illustrated in FIGS. 4A and 4B, may be used to increase the effective length of the spring member. One end of each of the pair of flexures 420a and 420b may be attached to fixed mounting points 430a-430d. The pair of flexures 420a and 420b may be flexed in both the horizontal direction and the vertical direction, so as to translate the frame 410 horizontally and vertically, as indicated by the arrows in FIGS. 4A and 4B, respectively. In practice, to raster scan the electro-optic assembly of the LiDAR system horizontally and vertically, the frame 410 may be vibrated at or near its resonance frequencies in both horizontal and vertical directions.

Figure 5:
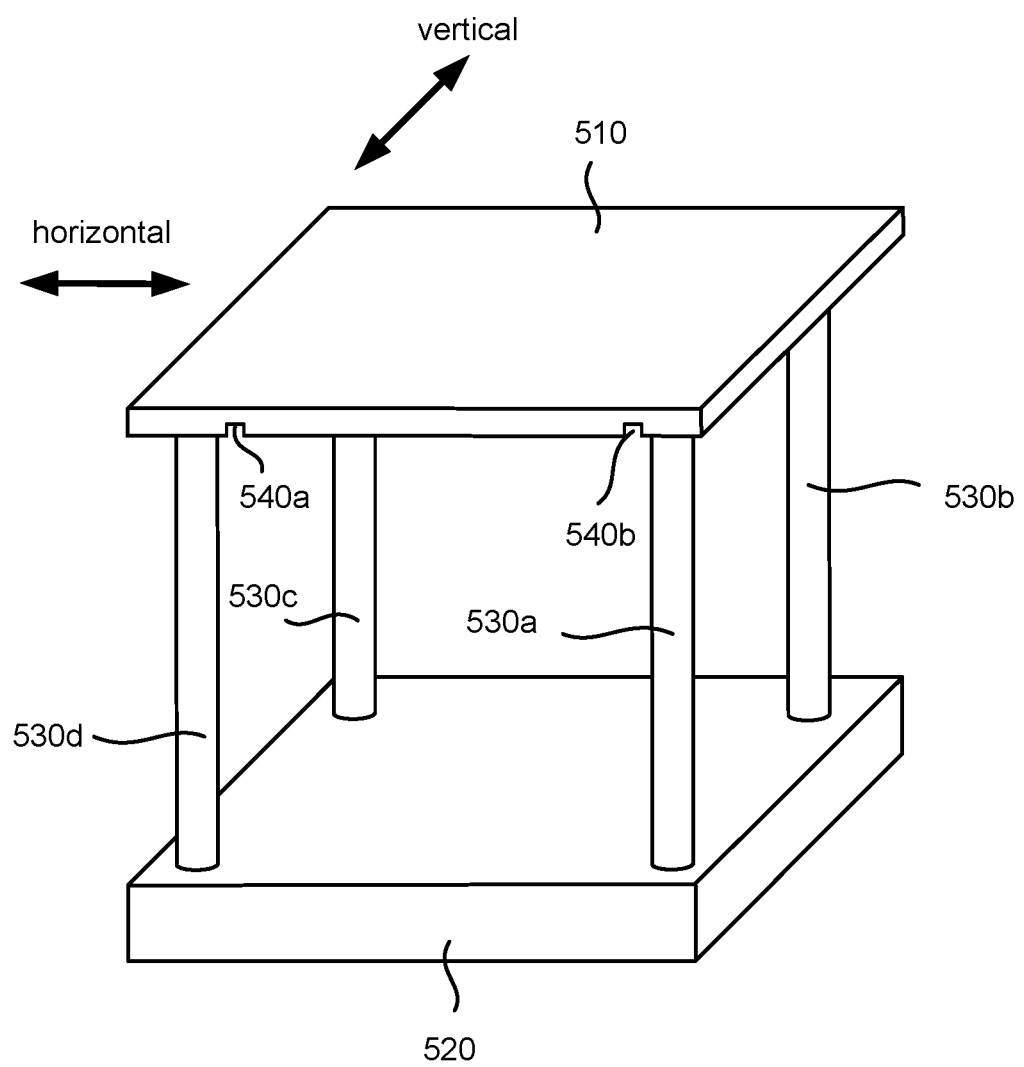
FIG. 5 illustrate schematically a flexure mechanism for scanning a LiDAR system according to some further embodiments.

FIG. 5 illustrates schematically a resonator structure for scanning a LiDAR system according to some further embodiments of the present invention. A frame 510 may be attached to a fixed base 520 by a set of four rod springs 530a-530d. The frame 510 may carry an electro-optic assembly of the LiDAR system. For clarity, a counterbalance frame and a set of associated rod springs are not shown in FIG. 5.

The rod springs 530a-530d may be made of spring steel such as music wires. The rod springs 530a-530d may be made to have slightly different resonance frequencies in the horizontal and vertical directions. In some embodiments, this may be achieved by making the rod springs 530a-530d stiffer in the horizontal direction than in the vertical direction, or vice versa. In some other embodiments, this may be achieved by making the rod springs 530a-530d having a rectangular or an oval cross-section over a portion or an entire length thereof. Using springs with an oval cross-section may reduce stresses at the corners as compared to springs with a rectangular cross-section. Alternatively, each rod spring 530a-530d may have a rectangular cross-section with rounded corners to reduce stress. In some further embodiments, the frame 510 may include features such as the grooves 540A and 540B so that the mounting is stiffer in one direction than the other, thus inducing a difference in the resonance frequencies even if the rods are symmetrical in cross-section. Such mounting features may alternatively be incorporated into the fixed base 520 as well.

Many variations of implementing the resonator structures illustrated in FIG. 4A-4B or 5 in a LiDAR system are possible. For example, the LiDAR system may have two electro-optic assemblies, each having one or more laser sources and one or more photodetectors. The two electro-optic assemblies may be mounted on two separate frames. Resonator structures coupled to the two frames may be configured to move the two frames in opposite directions.

In some embodiments, voice coil motors (VCMs) may be arranged to drive a single frame, or both frames. Natural coupling between two resonators may ensure that, even if only one frame is driven, both may vibrate at approximately equal amplitudes. The voice coil motors may have a moving coil design or a moving magnet design. In some embodiments, the coil may be mounted on one frame and the magnet may be mounted on the other frame. The stiffness of a resonator for a counterweight or a VCM may be increased along with a corresponding reduction in amplitude, such that a momentum of one frame substantially cancels the momentum of the other frame.

According to various embodiments, separate VCMs may be used for motions along the two orthogonal axes, or a single VCM may be used that combines the drives for motions along both axes. In the latter case, a high Q resonance structure may be used to ensure that, although the single VCM is driven at both frequencies for the two axes, the frame primarily moves at its respective resonant frequency in each respective direction. Piezoelectric transducers or other linear actuators may also be used instead of a VCM as the driving mechanism.

Figure 6:
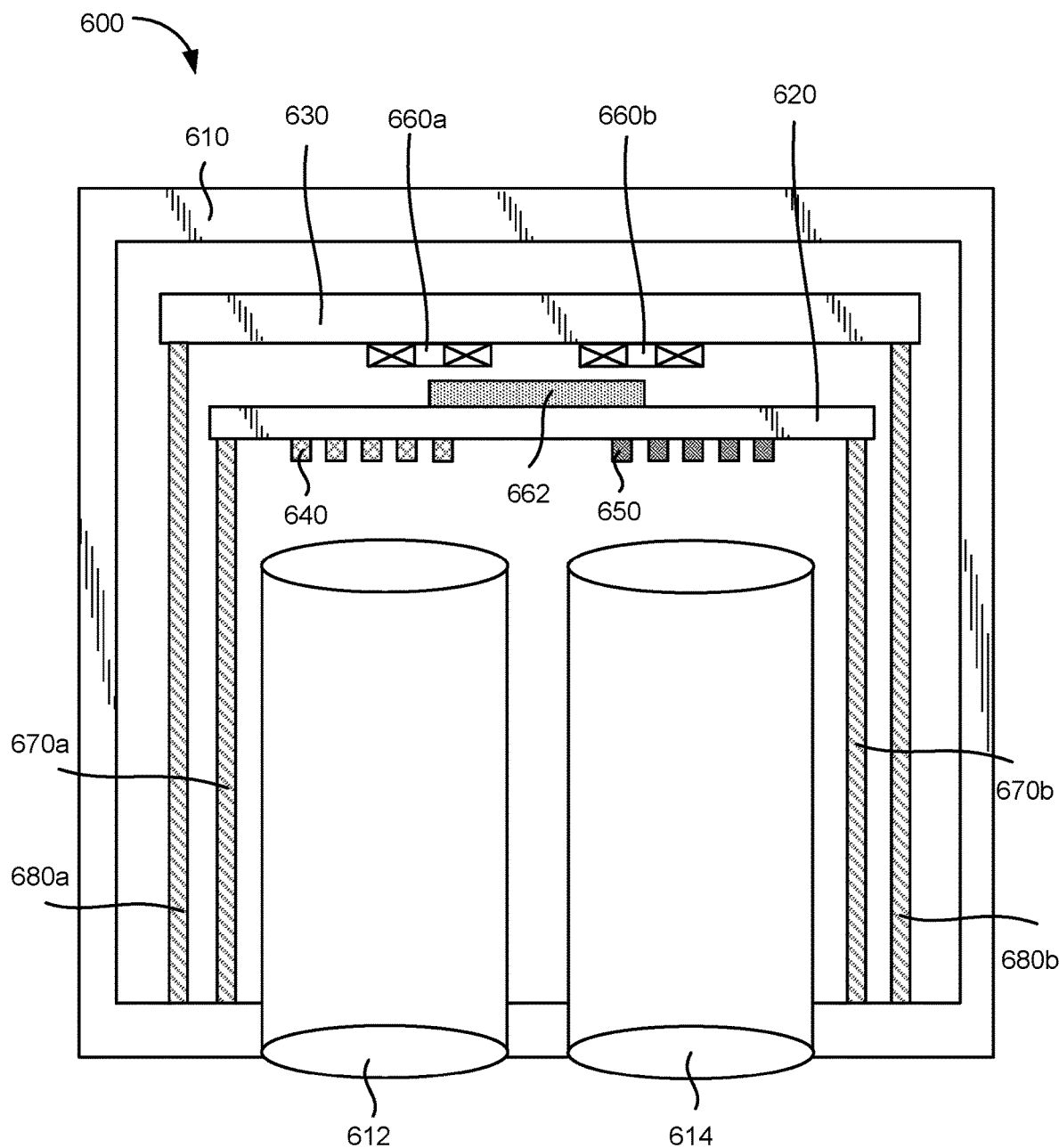
FIG. 6 illustrates schematically a two-dimensional scanning LiDAR system according to some embodiments.

FIG. 6 illustrates schematically a two-dimensional scanning LiDAR system 600 with a Lissajous scan mechanism according to some embodiments of the present invention. The LiDAR system 600 may include a fixed frame 610, a first platform 620 movably attached to the fixed frame 610 via a first set of flexures 670a and 670b, and a second platform 630 movably attached to the fixed frame 610 via a second set of flexures 680a and 680b. An emission lens 612 and a receiving lens 614 are mounted on the fixed frame 610. The LiDAR system 600 includes an electro-optic assembly that may include one or more laser sources 640 and one or more photodetectors 650. The one or more laser sources 640 and the one or more photodetectors 650 are mounted on the first platform such that the emission surfaces of the one or more laser sources 640 lie substantially in a focal plane of the emission lens 612, and the detection surfaces of the one or more photodetectors 650 lie substantially in a focal plane of the receiving lens 614.

The first set of flexures 670a and 670b may be configured to move the first platform 630 left or right and in or out of the page relative to the fixed frame 610. A voice coil motor (VCM) that comprises a pair of coils 660a and 660b and a magnet 662 may be mounted between the first platform 620 and the second platform 630. In some embodiments, the magnet 662 may be mounted the first platform 620, and the pair of coils 660a and 660b may be mounted on the second platform 630, as illustrated in FIG. 6. The VCM may be configured to move the first platform 620 left or right, and move the second platform 630 in the opposite direction. The second platform 630 may serve as a counterweight to the first platform 620, so that the momentum of the second platform 630 may substantially cancel out the momentum of first platform 620. In some other embodiments, the positioning of the pair of coils 660a and 660b and the magnet 662 may be reversed; that is, the pair of coils 660a and 660b may be mounted on the first platform 620, and the magnet 662 may be mounted on the second platform 630. A second VCM (not shown) may be used to move the first platform 620 and the second platform 630 in or out of the page.

Figure 7:
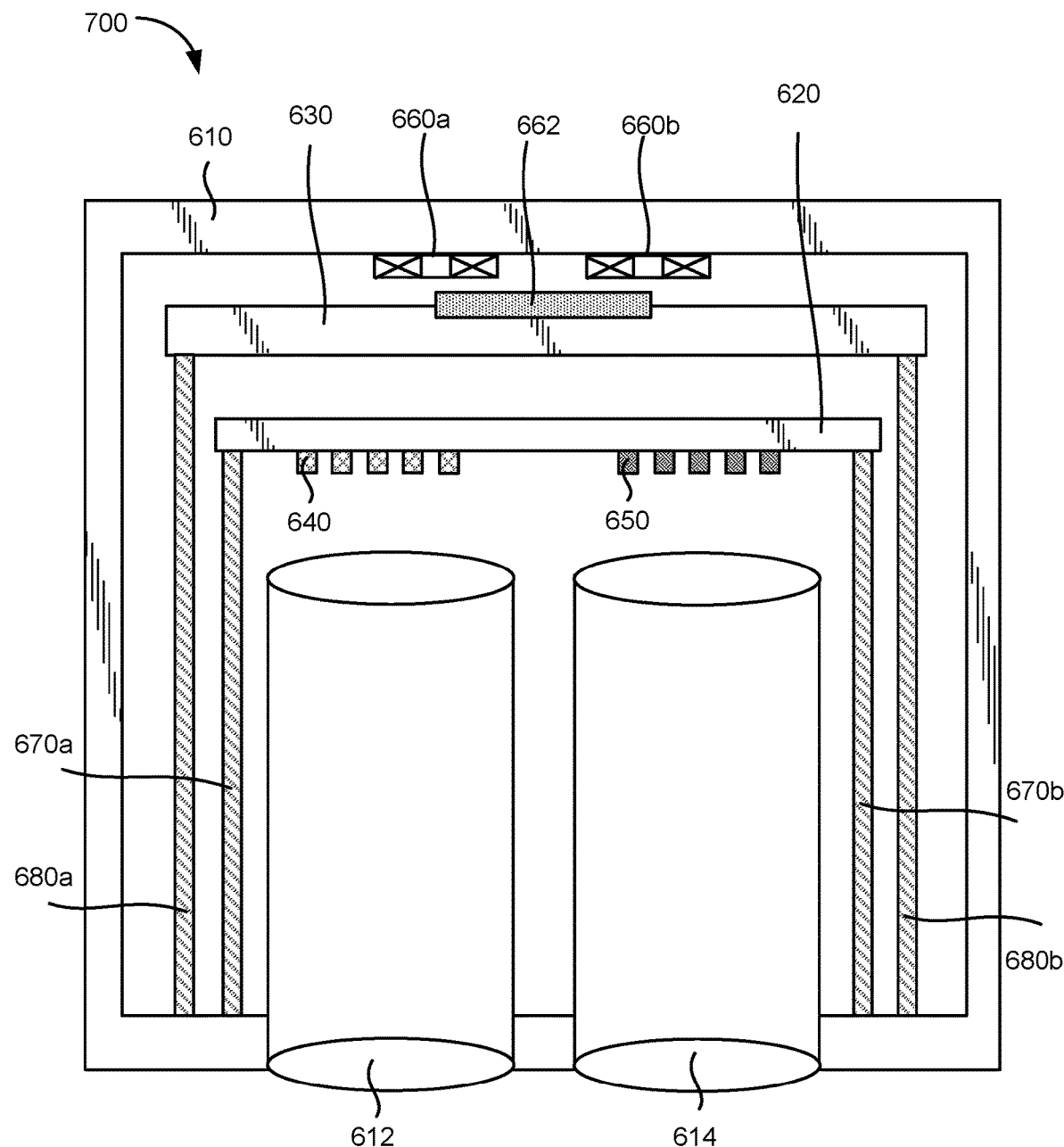
FIG. 7 illustrates schematically a two-dimensional scanning LiDAR system according to some other embodiments.

FIG. 7 illustrates schematically a two-dimensional scanning LiDAR system 700 with a Lissajous scan mechanism according to some other embodiments of the present invention. The LiDAR system 700 is similar to the LiDAR system 600 illustrated in FIG. 6. But here, VCM is mounted between the fixed frame 610 and the second platform 630, where the pair of coils 660a and 660b is mounted on the fixed frame, and the magnet 662 is mounted on the second platform 630. The VCM is configured to move the second platform 630, which may carry a counterweight, left or right. The first platform 620 that carries the electro-optic assembly may vibrate sympathetically in the opposite direction of the second platform 630 if the resonant frequency of the first platform matches that of the second platform 630. A second set of coils and a second magnet (not shown) may be used to move the second platform 630 in or out of the page.

Figure 8:
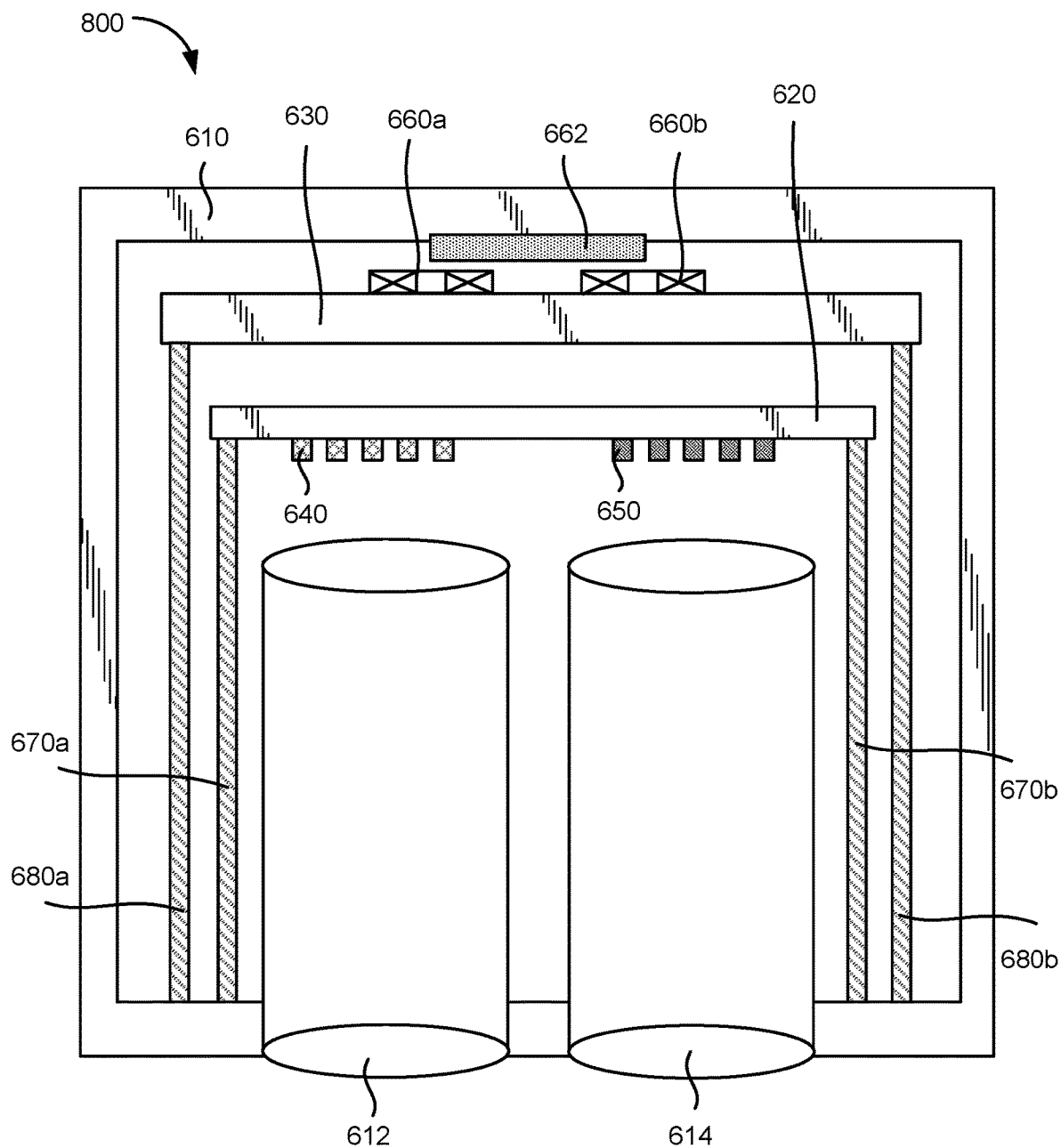
FIG. 8 illustrates schematically a two-dimensional scanning LiDAR system according to some further embodiments.

FIG. 8 illustrates schematically a two-dimensional scanning LiDAR system 800 with a Lissajous scan mechanism according to some further embodiments of the present invention. The LiDAR system 800 is similar to the LiDAR system 700 illustrated in FIG. 7. But here, the positioning of the pair of coils 660a and 660b and the magnet 662 is reversed. That is, the pair of coils 660a and 660b is mounted on the second platform 630, and the magnet 662 is mounted on the fixed frame 610.

Figure 9:
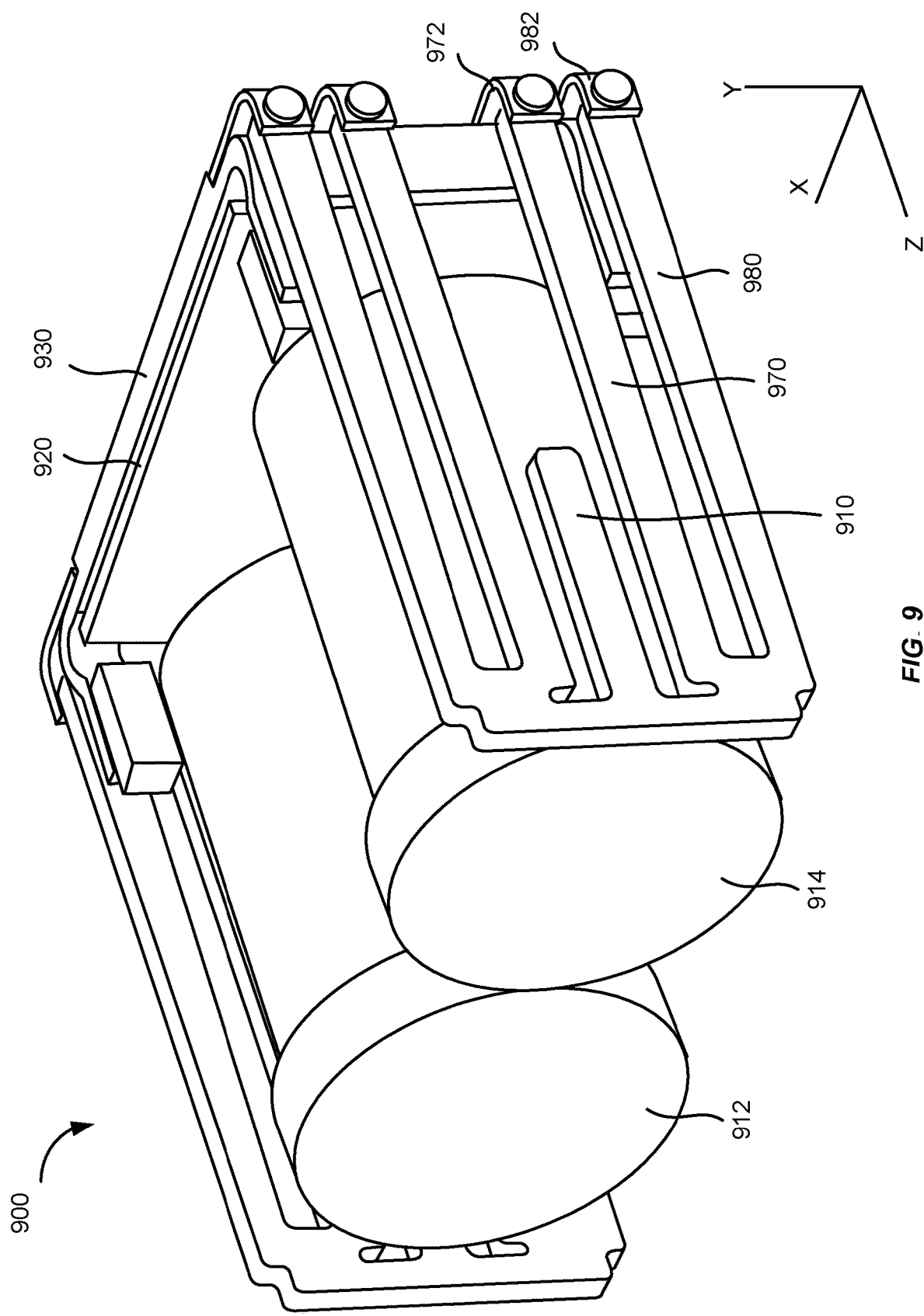
FIGS. 9 and 10 show a perspective view and a top view, respectively, of a two-dimensional scanning LiDAR system 900 according to some embodiments.
Figure 10:
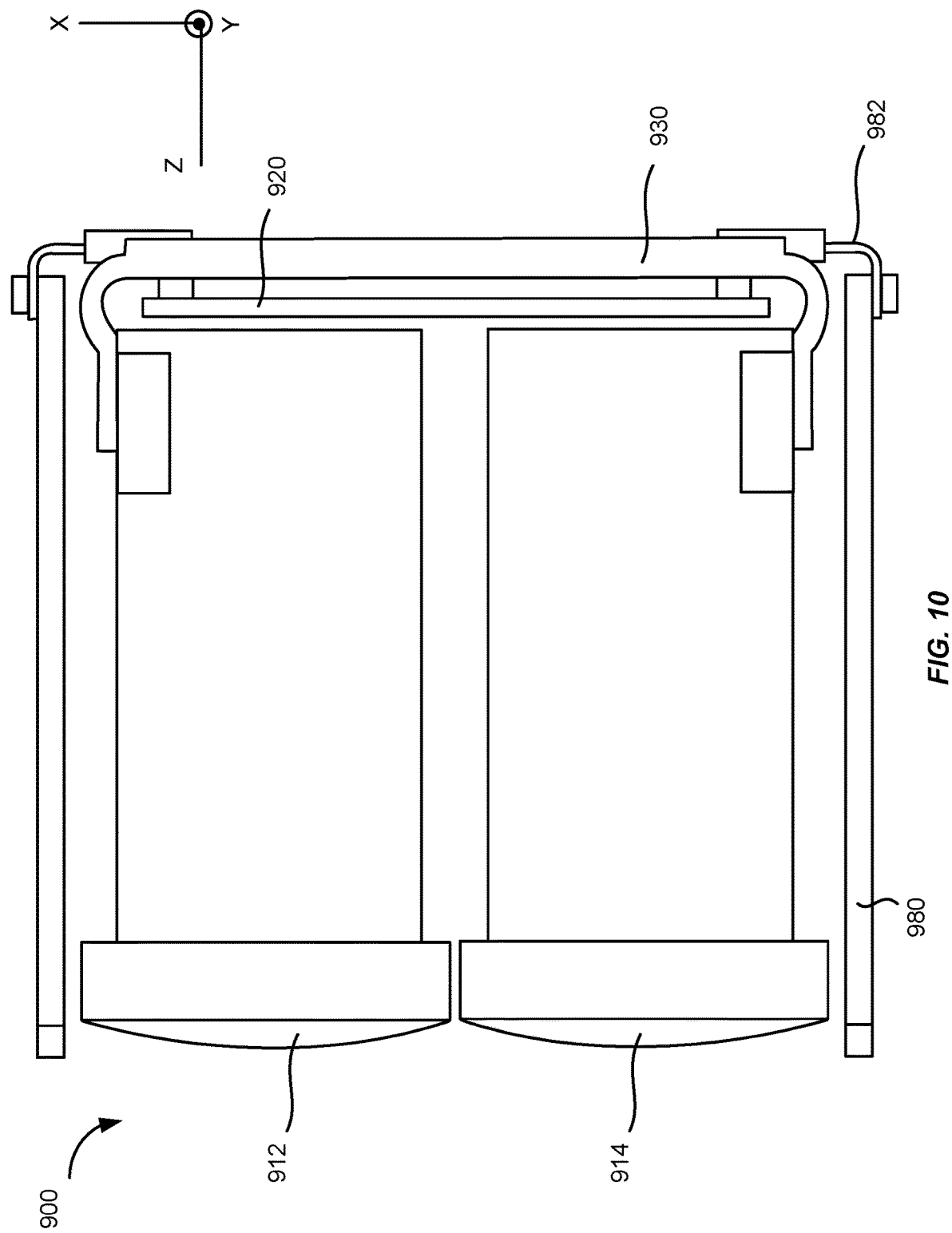

FIGS. 9 and 10 show a perspective view and a top view, respectively, of a two-dimensional scanning LiDAR system 900 according to some embodiments of the present invention. The LiDAR system 900 includes an emission lens 912 and a receiving lens 914 attached to a fixed base 910, a first frame 920 that may carry an electro-optic assembly of the LiDAR system 900, and a second frame 930 that may carry a counterweight. A first set of flexures 970 may flexibly couple the first frame 920 to the fixed base 910 via a first set of flexible hinges 972. A second set of flexures 980 may flexibly couple the second frame 930 to the fixed base 910 via a second set of flexible hinges 982. Each of the first set of flexible hinges 972 and the second set of flexible hinges 982 may be in the form of a ribbon so that it may be stiffer in the Y direction (e.g., vertical direction) than in the X direction (e.g., horizontal direction).

Figure 11:
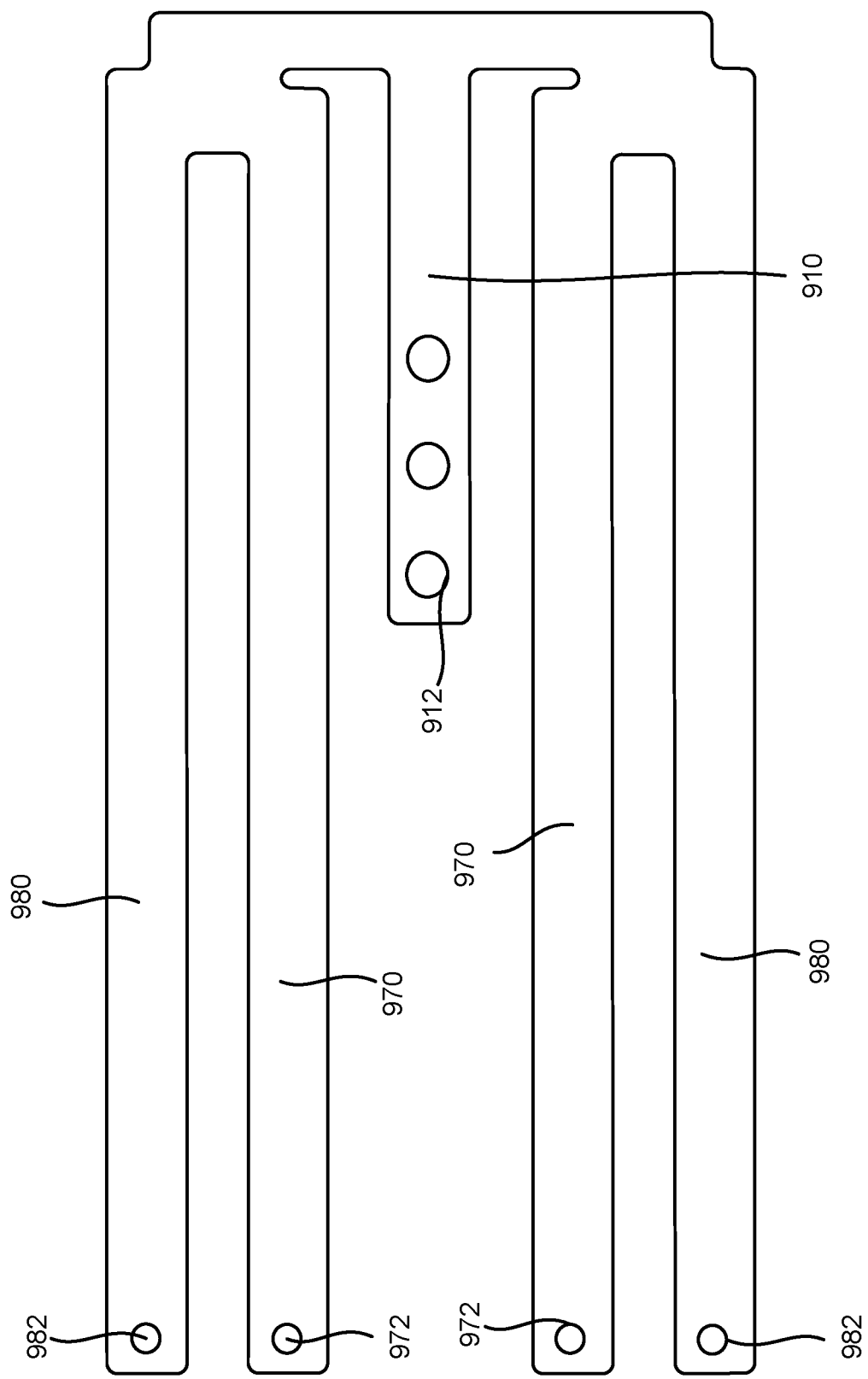
FIG. 11 shows a plan view of a flexure structure that may be used in the LiDAR system illustrated in FIGS. 9 and 10 according to some embodiments.

FIG. 11 shows a plan view of a flexure structure that may be used in the LiDAR system 900 illustrated in FIGS. 9 and 10 according to some embodiments of the present invention. As illustrated, the flexure structure includes a fixed base 910. The fixed base 910 may include one or more mounting holes 912 for connecting to a fixed outer frame (not shown in FIGS. 9 and 10). The flexure structure may further include a set of first flexures 970. One end of each first flexure 970 may be connected to the fixed base 910, while the other end of each first flexure 970 may have a mounting hole 972 for connecting to the first frame 920 that carries the electro-optic assembly of the LiDAR system 900, as illustrated in FIGS. 9 and 10. The flexure structure further includes a set of second flexures 980. One end of each second flexure 980 may be connected to the fixed base 910, while the other end of each second flexure 980 may have a mounting hole 982 for connecting to the second frame 930 that carries a counterweight.

While FIGS. 3A-3B, 4A-4B, and 5-11 show some examples of scanning a LiDAR system by translating an electro-optic assembly in two orthogonal directions along a plane using flexures, scanning a LiDAR system can also be performed by vibrating one or two mirrors according to some embodiments. For example, a single mirror can be vibrated in two orthogonal angles. Alternatively, a LiDAR system can include a pair of mirrors positioned sequentially, and each mirror can be vibrated (e.g., tilted) in a direction orthogonal to that of the other. In some embodiments, scanning a LiDAR system can also be performed by rotating a pair of polygonal mirrors or rotating a pair of prisms (e.g., rotating 360 degrees). According to some embodiments, the mirrors can be, for example, a few centimeters in dimension. In some implementations, MEMs mirrors that are a few millimeters in dimension can be used.

Figure 12A:
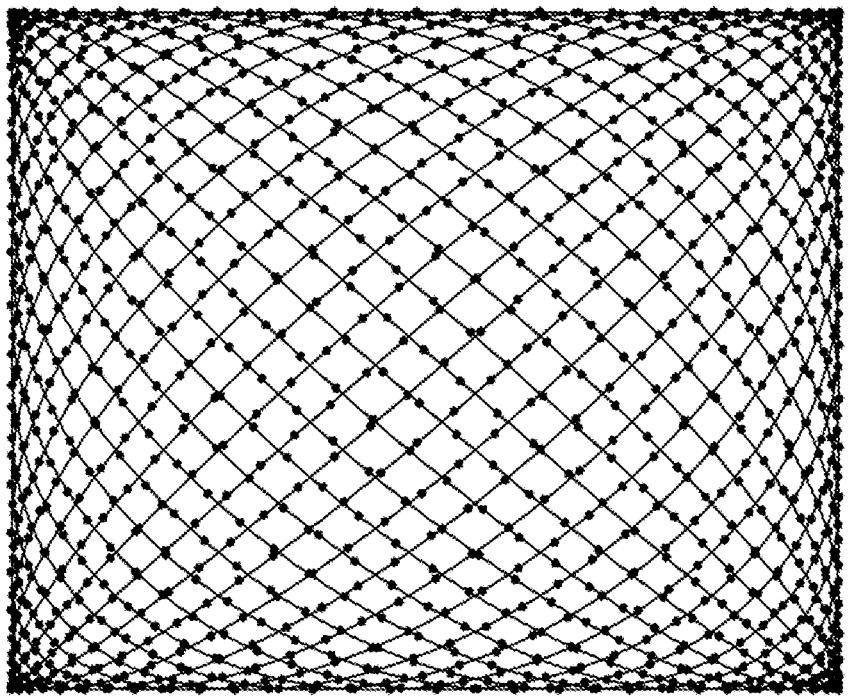
FIGS. 12A and 12B show some examples of full Lissajous patterns according to some embodiments.

According to some embodiments, instead of completing a full Lissajous scan pattern per frame, a half or a quarter Lissajous scan pattern may be completed per frame. FIG. 12A shows an example of a full Lissajous pattern. For example, this full Lissajous pattern can be achieved by selecting the scanning frequencies in the two orthogonal directions a and b to be 190 Hz and 200 Hz, respectively. For a frame rate of 10 frames/see, one full Lissajous pattern may be scanned per frame, and the Lissajous pattern may repeat identically frame to frame. The dots along the scan lines indicate the scan points, assuming a uniform laser firing rate.

There can be two potential issues related with full Lissajous scan patterns. For example, the scan lines can traverse both from lower right to upper left (e.g., in the first half of the Lissajous pattern) and from lower left to upper right (e.g., in the second half of the Lissajous pattern). The resulting crisscross pattern can make it difficult to achieve a uniform distribution of scan points. For instance, in the example illustrated in FIG. 12A, some scan points are closer to each other than some others.

Figure 12B:
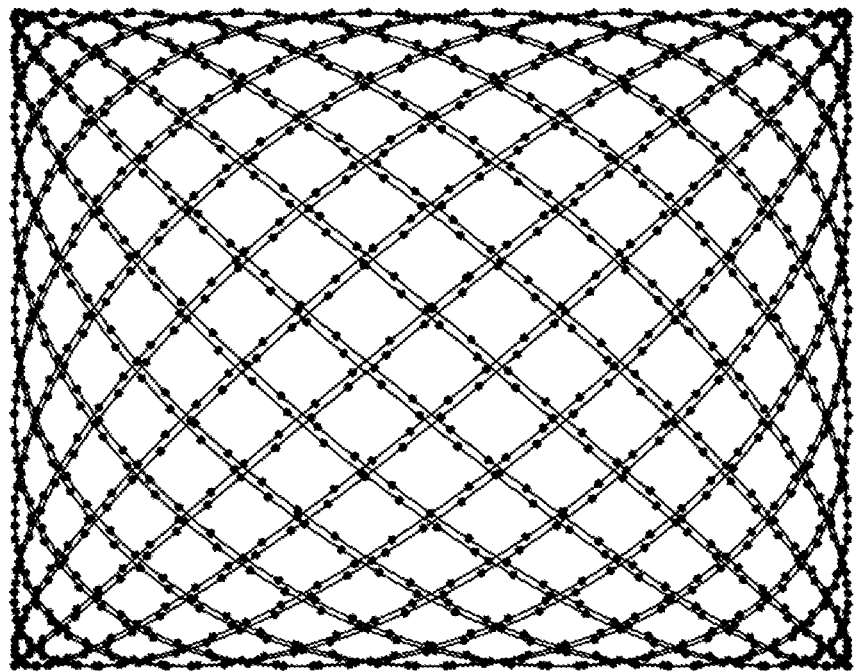

As another example, if the phase between the horizontal scan and the vertical scan (e.g., δ in equation (3)) is not controlled properly, some scan lines can nearly overlap with each other. FIG. 12B shows an example. As illustrated in FIG. 12B, the scan points can be too dense in those regions adjacent the overlapping scan lines, and too sparse in the spaces between the overlapping scan lines. Thus, this can result in poor resolutions in some regions.

Figure 13A:
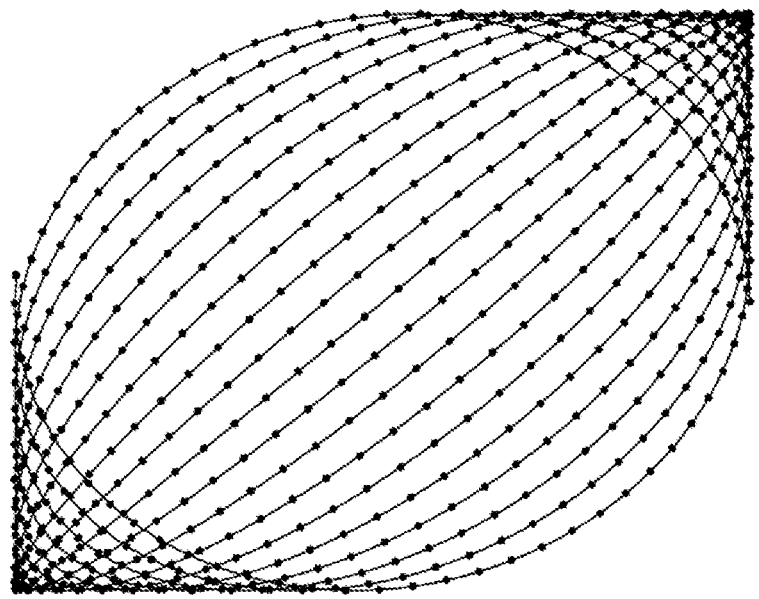
FIG. 13A shows an exemplary half Lissajous pattern according to some embodiments.
Figure 13B:
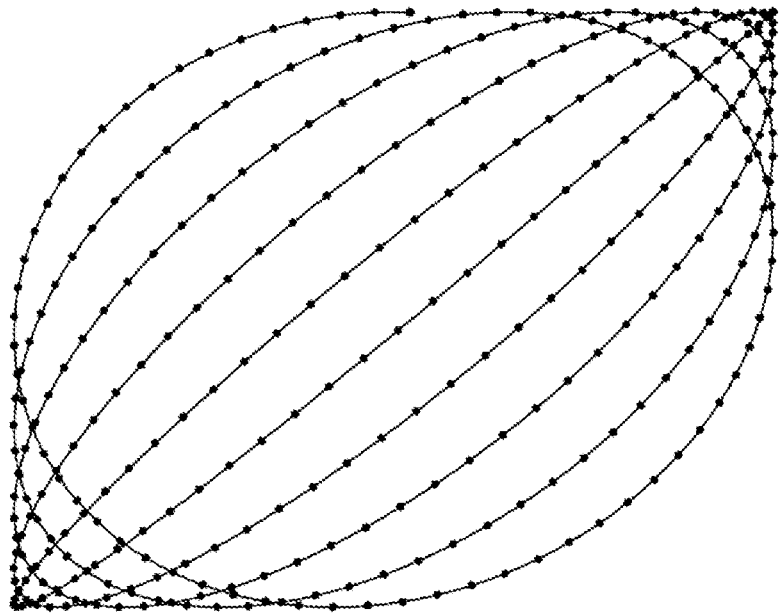
FIG. 13B shows an exemplary quarter Lissajous pattern according to some embodiments.

According to some embodiments, LiDAR systems may advantageously use a half Lissajous scan pattern or a quarter Lissajous scan pattern, instead of a full Lissajous scan pattern. FIG. 13A shows an exemplary half Lissajous pattern. FIG. 13B shows an exemplary quarter Lissajous pattern. Assuming that the scan frequencies in the horizontal and vertical directions are 190 Hz and 200 Hz, respectively, a half Lissajous scan pattern shown in FIG. 13A may be completed in 1/20th of a second, resulting in a frame rate of 20 frames/sec. For the same scan frequencies, the quarter Lissajous scan pattern shown in FIG. 13B may be completed in 1/40th of a second, resulting in a frame rate of 40 frames/sec. Note that a half Lissajous scan pattern and a quarter Lissajous scan pattern may not have the issue of crisscross patterns as in full Lissajous scan patterns as illustrated in FIGS. 12A and 12B.

In some embodiments, to keep the density of scan lines more uniform, and to keep the frame rate for a half Lissajous scan pattern the same as that for a full Lissajous pattern (e.g., 10 frames/sec), the scan frequencies in the horizontal and vertical directions can be adjusted to be, for example, 195 Hz and 200 Hz, respectively. To keep the frame rate for a quarter Lissajous scan pattern the same as that for a full Lissajous pattern (e.g., 10 frames/sec), the scan frequencies in the horizontal and vertical directions can be adjusted to be, for example, 197.5 Hz and 200 Hz, respectively. According to some embodiments, a scanning LiDAR system may output point clouds at a frame rate that is multiples of the difference between the scanning frequencies in the two orthogonal directions. For example, if the frame rate is twice of the difference between the scanning frequencies in the two orthogonal directions, a half Lissajous scan pattern may be completed in each frame. If the frame rate is four times the difference between the scanning frequencies in the two orthogonal directions, a quarter Lissajous scan pattern may be completed in each frame.

Figure 14:
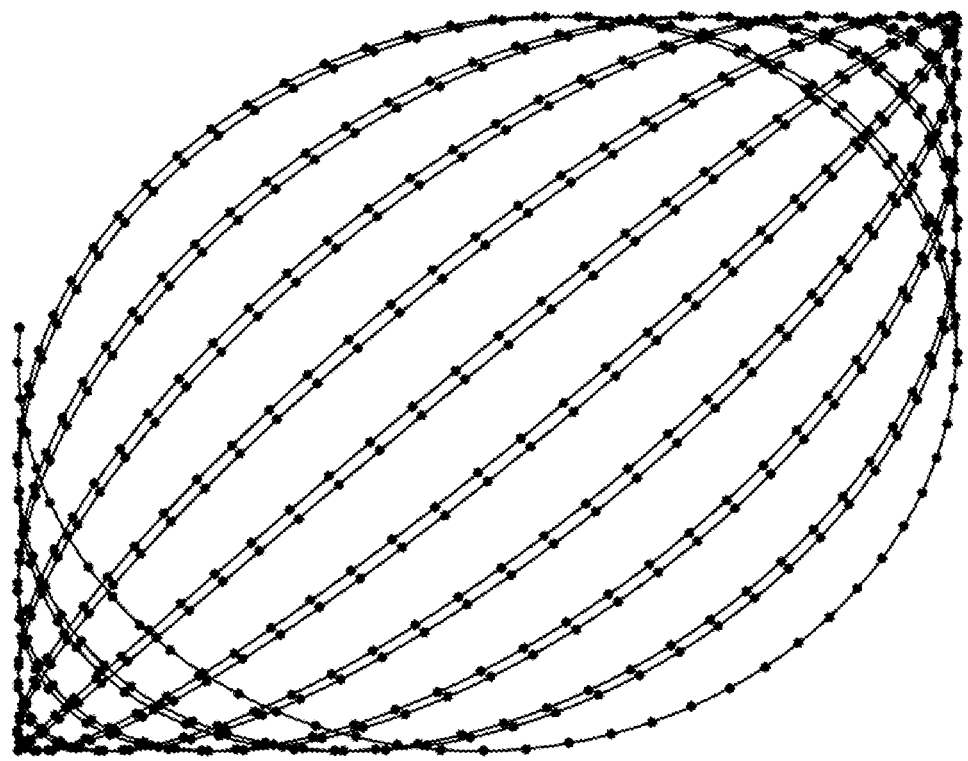
FIG. 14 shows an example of a half Lissajous pattern according to some embodiments.

A half Lissajous scan pattern can also have nearly overlapping scan lines if the phase between the horizontal and vertical scans is not properly controlled. FIG. 14 shows an example. This is because a half Lissajous scan pattern is essentially the sum of two quarter Lissajous scan patterns. Thus, in order to achieve uniformly distributed scan lines, the horizontal and vertical scans may need to be in a proper phase relationship with respect to each other, so that the two quarter Lissajous scan patterns interlace with each other instead of overlap with each other. In comparison, a quarter Lissajous scan pattern may not have any particular phase requirement between the horizontal and vertical scans. Thus, quarter Lissajous scan patterns can circumvent the possible problem of overlapping scan lines.

Figure 15A:
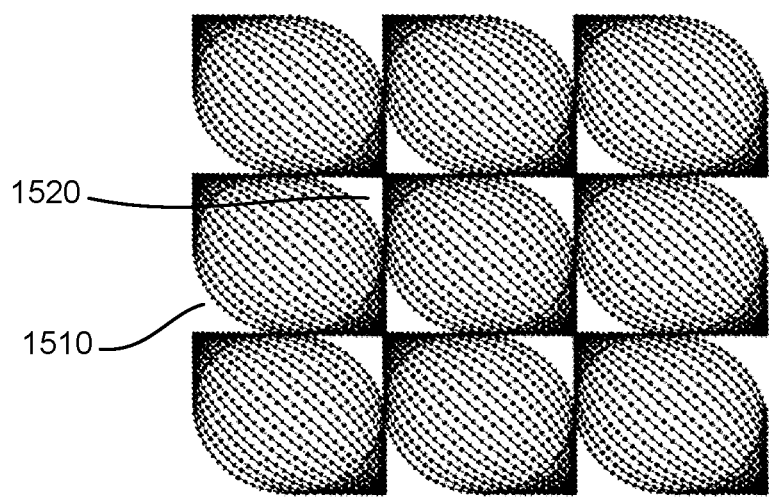
FIGS. 15A-15C and 16A and 16B illustrate examples of how the sub-fields of a 3×3 array of laser sources can be tiled to cover a larger full field of view according to various embodiments.

In some LiDAR implementations, an array of laser sources may be used to project a full field of view, with each individual laser source covering a respective sub-field of the full field of view. FIG. 15A illustrates an example of how the sub-fields of a 3×3 array of laser sources can be tiled to cover a larger full field of view. In this example, each sub-field is a half Lissajous scan pattern, in which scan lines run diagonally between upper left and lower right.

As illustrated in FIG. 15A, there may be gaps at the corners of each sub-field (e.g., the lower left corner 1510 and the upper right corner 1520) where there are no scan points. According to some embodiments, each laser source is scanned with a first amplitude in the horizontal directions such that adjacent sub-fields in the horizontal direction slightly overlap with each other, so that a corner of one sub-field may partially or fully fill the gap of an adjacent sub-field on the left or on the right. Additionally or alternatively, each laser source may be scanned with a second amplitude in the vertical directions such that adjacent sub-fields in the vertical direction slightly overlap with each other, so that a corner of one sub-field may partially or fully fill the gap of an adjacent sub-field up or down.

Figure 15B:
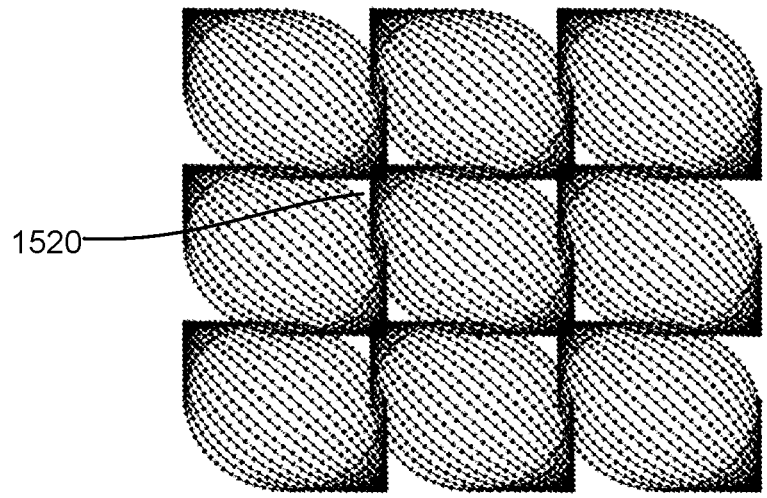

FIG. 15B shows an example in which adjacent sub-fields overlap with each other by about 7.5% in both the horizontal and vertical directions. As illustrated, a gap in a corner of a sub-field may be filled by corners of adjacent sub-fields (e.g., the corner 1520 is partially filled by the lower right corner of the sub-field above and by the upper left corner of the sub-field to the right). At 7.5% overlap, there may still be some residual gaps.

Figure 15C:
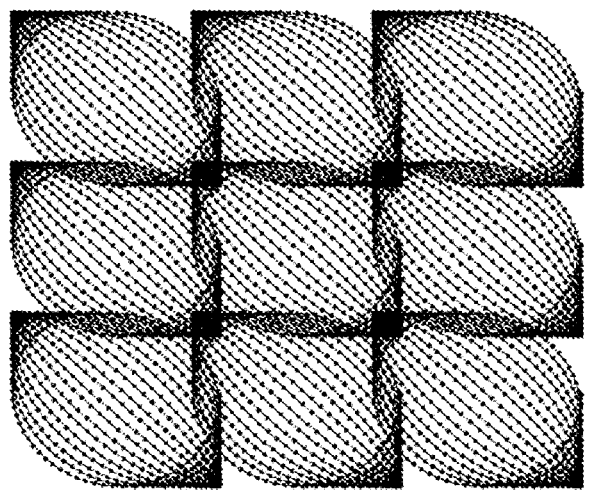

FIG. 15C shows an example in which adjacent sub-fields overlap with each other by about 15% in both the horizontal and vertical directions. As illustrated, the gaps are completely filled. In some embodiments, the firing rate of the laser sources can be reduced in the overlapping regions of the field of view to provide a relatively uniform density of points. Alternatively, in each overlapping region between two adjacent sub-fields, the firing of one of the two neighboring laser sources can be stopped. In addition, the firing rate of each laser source can be lower at the edge of the scan lines (e.g., the upper left and lower right corners of the half Lissajous scan pattern), at which the mechanical motion of the laser source may be slower.

Figure 16A:
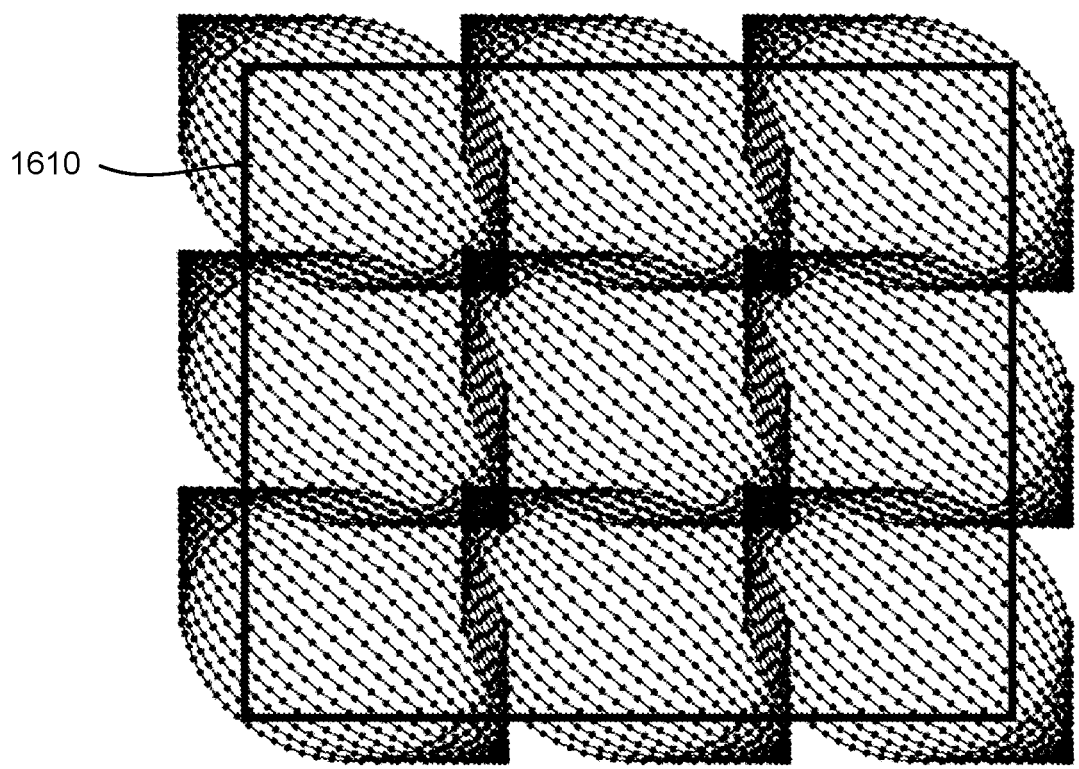

In some embodiments, the edges of the full field of view can be cut, as indicated by the rectangular outline 1610 in FIG. 16A, so as to project a rectangular field of view without gaps. For example, a rectangular aperture can be placed in front of the array of laser sources to define the field of view. Alternatively, the firing of a respective laser source can be stopped when the laser source is outside the desired field of view.

Figure 16B:
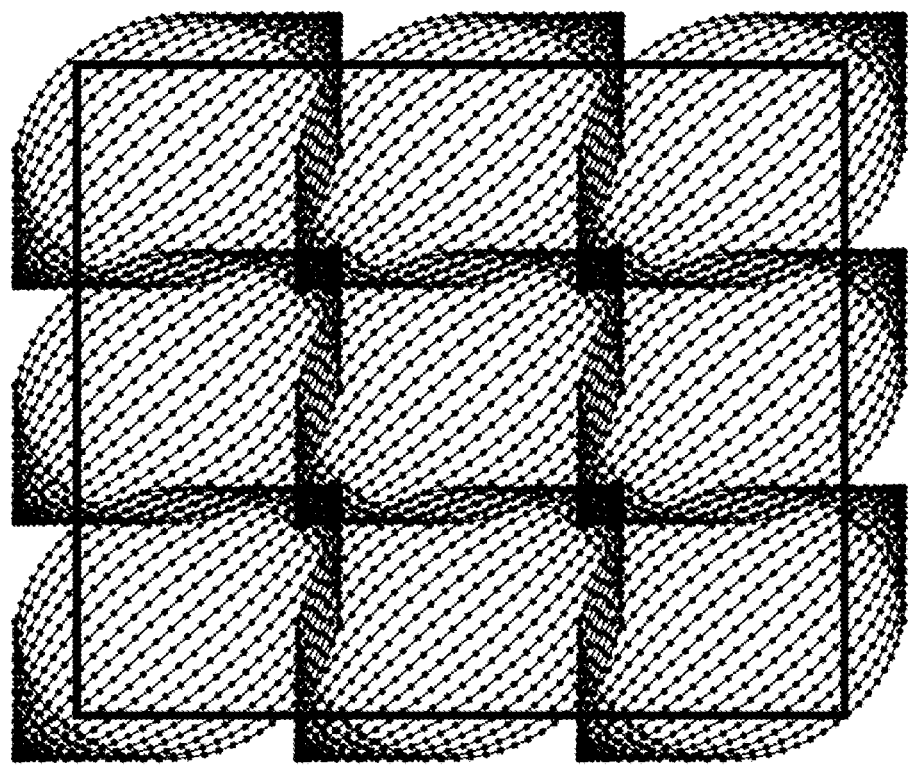

In some embodiments, after one half of a full Lissajous scan pattern is completed (e.g., either one frame of a half Lissajous scan pattern or two frames of a quarter Lissajous scan pattern), the next half of the full Lissajous scan pattern can be oriented along the opposite diagonal direction from the previous half of the full Lissajous scan pattern. For example, as illustrated in FIG. 16B, the same tiling of the 3×3 sub-fields can be maintained, but each half Lissajous scan pattern includes scan lines that run diagonally between lower left and upper right.

Note that the same mechanical system (see some exemplary systems described below) may be used for a full Lissajous scan pattern, a half Lissajous scan pattern, or a quarter Lissajous scan pattern. For the same scan frequencies in the horizontal and vertical directions (e.g., 190 Hz and 200 Hz, respectively), a half Lissajous scan pattern would have a frame rate that is twice of that of a full Lissajous scan pattern, but with a lower spatial resolution. A quarter Lissajous scan pattern would have a frame rate that is four times that of a full Lissajous scan pattern, with even a lower spatial resolution than that of a half Lissajous scan pattern. For a half Lissajous scan pattern, the scan pattern may switch the diagonal orientation with every frame. For a quarter Lissajous scan pattern, the scan pattern may switch the diagonal orientation with every two frames.

Figure 17:
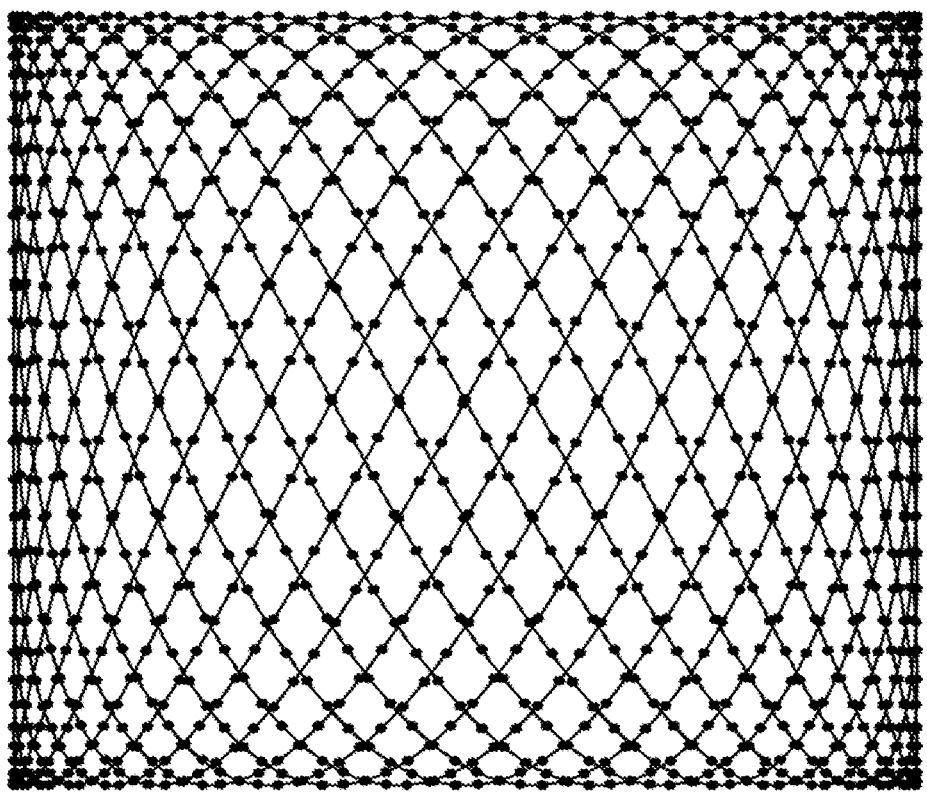
FIG. 17 shows an exemplary full Lissajous pattern according to some embodiments.

If the scan frequencies in the horizontal and vertical directions are close such that a ratio between the two frequencies is close to one, the spatial resolutions in the horizontal and vertical directions may be similar. In some cases, it may be desirable to have different spatial resolutions in the horizontal and vertical directions. This can be achieved by having the scan frequencies in the horizontal and vertical directions substantially different. FIG. 17 shows an exemplary Lissajous pattern (a full Lissajous pattern) obtained with scan frequencies of 100 Hz and 210 Hz in the horizontal and vertical directions, respectively. As illustrated, the points (represented by the solid dots) are generally denser in the horizontal direction than in the vertical direction, resulting in higher resolution in the horizontal direction than in the vertical direction. In general, the larger the difference between the scan frequencies in the horizontal and vertical directions, the more significant difference between the resolutions in the horizontal and vertical directions.

In general, the frame rate is a function of the difference between the scan frequencies in the horizontal and vertical directions. For some mechanical systems (e.g., the systems illustrated in FIGS. 3A-3B, 4A-4B, and 5-11), it may be possible to tune the resonance frequencies in the horizontal and vertical directions over a narrow range. For example, the resonance frequencies of a mechanical system can be tuned by moving weights, adjusting mounting points, or the like. Thus, it may be possible to dynamically change the frame rate over a certain range by adjusting the resonance frequency in one direction. Because the frame rate is a function of a small difference between two large frequencies, a small change in one of the two frequencies can possibly result in a relatively large change in the frame rate.

Figure 18:
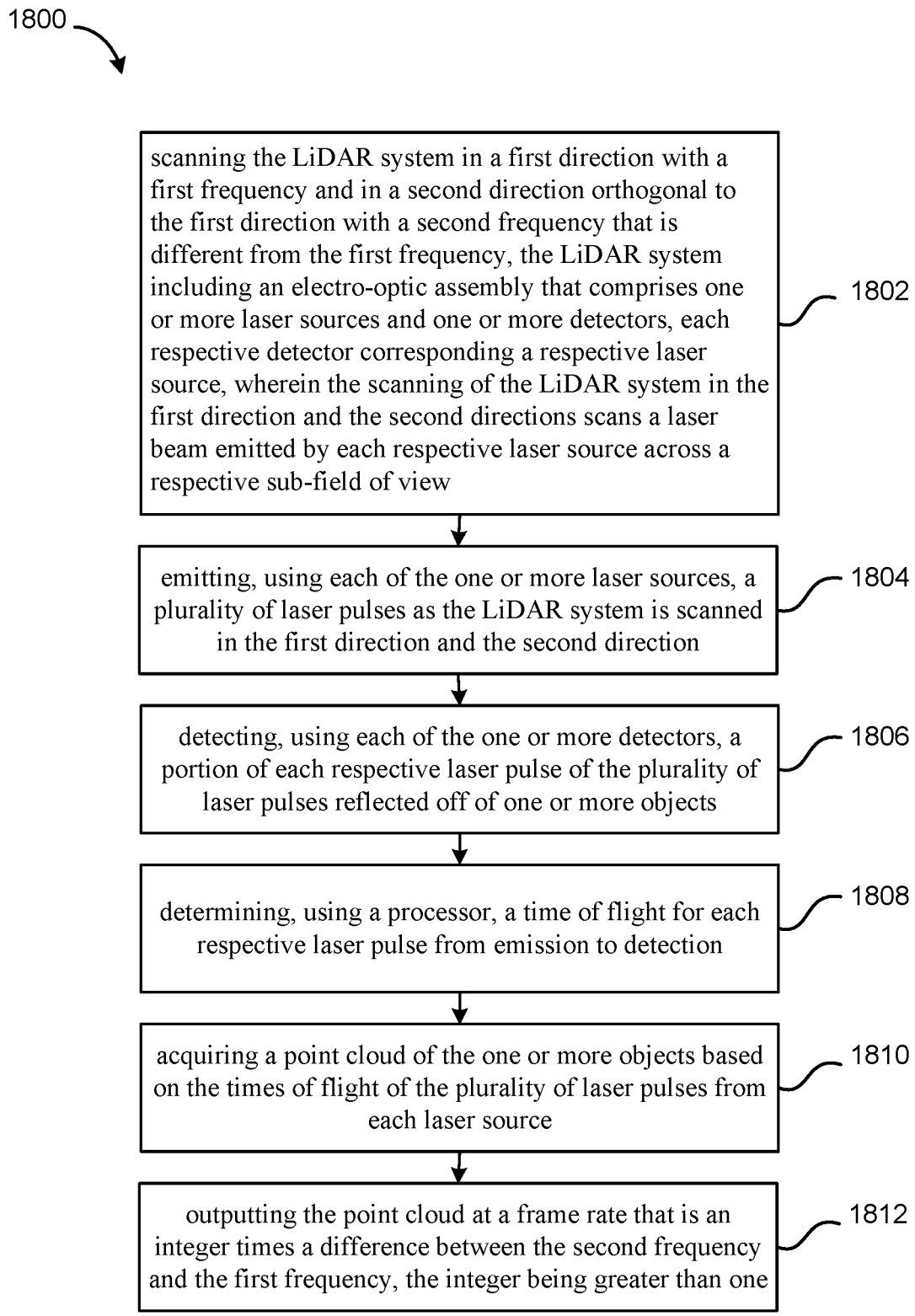
FIG. 18 shows a simplified flowchart illustrating a method of three-dimensional imaging using a LiDAR system according to some embodiments.

FIG. 18 shows a simplified flowchart illustrating a method 1800 of three-dimensional imaging using a LiDAR system according to some embodiments of the present invention.

The method 1800 includes, at 1802, scanning the LiDAR system in a first direction with a first frequency and in a second direction orthogonal to the first direction with a second frequency that is different from the first frequency. The LiDAR system includes an electro-optic assembly that comprises one or more laser sources and one or more detectors. Each respective detector corresponds a respective laser source. The scanning of the LiDAR system in the first direction and the second directions scans a laser beam emitted by each respective laser source across a respective sub-field of view.

The method 1800 further includes, at 1804, emitting, using each of the one or more laser sources, a plurality of laser pulses as the LiDAR system is scanned in the first direction and the second direction; and at 1806, detecting, using each of the one or more detectors, a portion of each respective laser pulse of the plurality of laser pulses reflected off of one or more objects.

The method 1800 further includes, at 1808, determining, using a processor, a time of flight for each respective laser pulse from emission to detection; at 1810, acquiring a point cloud of the one or more objects based on the times of flight of the plurality of laser pulses from each laser source; and at 1812, outputting the point cloud at a frame rate that is an integer times a difference between the second frequency and the first frequency, the integer being greater than one.

It should be appreciated that the specific steps illustrated in FIG. 18 provide a particular method of three-dimensional imaging using a LiDAR system according to some embodiments of the present invention. Other sequences of steps may also be performed according to alternative embodiments. For example, alternative embodiments of the present invention may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A scanning LiDAR system comprising:
a fixed frame;
a first platform;
an electro-optic assembly mounted on the first platform, the electro-optic assembly including one or more laser sources and one or more detectors, each respective detector corresponding a respective laser source;
a flexure assembly flexibly coupling the first platform to the fixed frame;
a drive mechanism configured to, via the flexure assembly, translate the first platform with respect to the fixed frame in two dimensions in a plane substantially perpendicular to an optical axis of the scanning LiDAR system; and
a controller coupled to the drive mechanism, the controller configured to:
cause the drive mechanism to translate the first platform in a first direction with a first frequency and in a second direction orthogonal to the first direction with a second frequency that is different from the first frequency; and
acquire a point cloud using the one or more laser sources and the one or more detectors while the first platform is being translated; and
output the point cloud at a frame rate that is an integer times a difference between the second frequency and the first frequency, the integer being greater than one.

2. The scanning LiDAR system of claim 1 wherein the integer is two, so that a trajectory of each laser source completes a half Lissajous scan pattern in each frame.

3. The scanning LiDAR system of claim 1 wherein the integer is four, so that a trajectory of each laser source completes a quarter Lissajous scan pattern in each frame.

4. The scanning LiDAR system of claim 1 wherein:
the one or more laser sources comprise a plurality of laser sources disposed as an array, and the one or more detectors comprise a plurality of detectors disposed as an array; and
the scanning LiDAR system is characterized by a field of view that comprises a plurality of sub-fields, wherein a trajectory of each respective laser source in each frame forms a respective sub-field.

5. The scanning LiDAR system of claim 4 wherein adjacent sub-fields of the plurality of sub-fields partially overlap with each other.

6. The scanning LiDAR system of claim 5 wherein an overlap between the adjacent sub-fields in the first direction is between 10% and 30%, and an overlap between the adjacent sub-fields in the second direction is between 10% and 30%.

7. The scanning LiDAR system of claim 1 wherein the flexure assembly comprises four springs, each of the four springs connecting a respective corner of the first platform to the fixed frame.

8. The scanning LiDAR system of claim 7 wherein each of the four springs comprises a flexible rod having a first resonant frequency in the first direction and a second resonant frequency in the second direction, and wherein the first frequency is substantially equal to the first resonant frequency, and the second frequency is substantially equal to the second resonant frequency.

9. The scanning LiDAR system of claim 1 wherein the flexure assembly comprises a first spring and a second spring, the first spring connecting a first lateral side of the first platform to the fixed frame, and the second spring connecting a second lateral side opposite to the first lateral side to the fixed frame.

10. The scanning LiDAR system of claim 1 wherein the drive mechanism is mechanically coupled to the first platform for translating the first platform.

11. The scanning LiDAR system of claim 10 wherein the drive mechanism comprises a voice coil motor that is mounted on the first platform.

12. A method of three-dimensional imaging using a LiDAR system, the method comprising:
scanning the LiDAR system in a first direction with a first frequency and in a second direction orthogonal to the first direction with a second frequency that is different from the first frequency, the LiDAR system including an electro-optic assembly that comprises one or more laser sources and one or more detectors, each respective detector corresponding a respective laser source, wherein the scanning of the LiDAR system in the first direction and the second directions scans a laser beam emitted by each respective laser source across a respective sub-field of view;

emitting, using each of the one or more laser sources, a plurality of laser pulses as the LiDAR system is scanned in the first direction and the second direction;

detecting, using each of the one or more detectors, a portion of each respective laser pulse of the plurality of laser pulses reflected off of one or more objects;

determining, using a processor, a time of flight for each respective laser pulse from emission to detection;

acquiring a point cloud of the one or more objects based on the times of flight of the plurality of laser pulses from each laser source; and outputting the point cloud at a frame rate that is an integer times a difference between the second frequency and the first frequency, the integer being greater than one.

13. The method of claim 12 wherein the integer is two, so that a trajectory of each laser source completes a half Lissajous scan pattern in each frame.

14. The method of claim 12 wherein the integer is four, so that a trajectory of each laser source completes a quarter Lissajous scan pattern in each frame.

15. The method of claim 12 wherein:
the one or more laser sources comprise a plurality of laser sources disposed as an array, and the one or more detectors comprise a plurality of detectors disposed as an array; and
the LiDAR system is characterized by a field of view that comprises a plurality of sub-fields of view.

16. The method of claim 15 wherein the LiDAR system is scanned in the first direction with a first amplitude so that adjacent sub-fields in the first direction partially overlap with each other.

17. The method of claim 16 wherein the LiDAR system is scanned in the second direction with a second amplitude so that adjacent sub-fields in the second direction partially overlap with each other.

18. The method of claim 17 wherein an overlap between the adjacent sub-fields in the first direction is between 10% and 30%, and an overlap between the adjacent sub-fields in the second direction is between 10% and 30%.

19. The method of claim 12 wherein scanning the LiDAR system comprises translating the electro-optic assembly in the first direction and the second direction in a plane that is substantially perpendicular to an optical axis of the LiDAR system.

20. The method of claim 19 wherein:
the electro-optic assembly is flexibly coupled to a fixed frame via a flexure assembly that has a first resonant frequency in the first direction, and a second resonant frequency in the second direction; and
translating the electro-optic assembly is performed via the flexure assembly, and the first frequency is substantially equal to the first resonant frequency, and the second frequency is substantially equal to the second resonant frequency.

* * * * *